United States Patent
Guillot et al.

(10) Patent No.: US 12,158,637 B2
(45) Date of Patent: *Dec. 3, 2024

(54) LENS ELEMENT

(71) Applicant: Essilor International, Charenton-le-Pont (FR)

(72) Inventors: Matthieu Guillot, Charenton-le-Pont (FR); Cyril Guilloux, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 1025 days.

This patent is subject to a terminal disclaimer.

(21) Appl. No.: 16/976,595

(22) PCT Filed: Mar. 1, 2019

(86) PCT No.: PCT/EP2019/055220
§ 371 (c)(1),
(2) Date: Aug. 28, 2020

(87) PCT Pub. No.: WO2019/166657
PCT Pub. Date: Sep. 6, 2019

(65) Prior Publication Data
US 2021/0048689 A1    Feb. 18, 2021

(30) Foreign Application Priority Data

Mar. 1, 2018 (EP) ...................... 18305216
Mar. 1, 2018 (EP) ...................... 18305217
(Continued)

(51) Int. Cl.
*G02C 7/00*    (2006.01)
*G02B 3/04*    (2006.01)
(Continued)

(52) U.S. Cl.
CPC ............... *G02C 7/022* (2013.01); *G02B 3/04* (2013.01); *G02C 7/06* (2013.01); *G02C 7/061* (2013.01);
(Continued)

(58) Field of Classification Search
CPC .......... G02C 7/022; G02C 7/06; G02C 7/061; G02C 7/066; G02C 7/086; G02C 2202/20;
(Continued)

(56) References Cited

U.S. PATENT DOCUMENTS

| | | |
|---|---|---|
| 1,955,047 A | 4/1934 | Beach |
| 3,902,693 A | 9/1975 | Crandon et al. |

(Continued)

FOREIGN PATENT DOCUMENTS

| | | |
|---|---|---|
| CA | 2 263 635 C | 9/1999 |
| CN | 101688983 A | 3/2010 |

(Continued)

OTHER PUBLICATIONS

Combined Chinese Office Action and Search Report issued Dec. 3, 2020 in corresponding Chinese Patent Application No. 201980004568.1 (with English Translation), 10 pages.

(Continued)

*Primary Examiner* — Henry Duong
(74) *Attorney, Agent, or Firm* — Oblon, McClelland, Maier & Neustadt, L.L.P.

(57) ABSTRACT

A lens element intended to be worn in front of an eye of a person includes a prescription portion having a first refractive power based on a prescription for correcting an abnormal refraction of the eye of the person and a second refractive power different from the first refractive power. The lens element further includes a plurality of at least three optical elements, at least one optical element having an (Continued)

optical function of not focusing an image on the retina of the eye so as to slow down the progression of the abnormal refraction of the eye.

12 Claims, 11 Drawing Sheets

(30) Foreign Application Priority Data

| | | | |
|---|---|---|---|
| Mar. 30, 2018 | (EP) | ..................................... | 18305384 |
| Mar. 30, 2018 | (EP) | ..................................... | 18305385 |
| Apr. 11, 2018 | (EP) | ..................................... | 18305435 |
| Apr. 11, 2018 | (EP) | ..................................... | 18305436 |
| Apr. 26, 2018 | (EP) | ..................................... | 18305526 |
| Apr. 26, 2018 | (EP) | ..................................... | 18305527 |

(51) Int. Cl.
  *G02C 7/02* (2006.01)
  *G02C 7/06* (2006.01)
  *G02C 7/08* (2006.01)

(52) U.S. Cl.
  CPC .............. *G02C 7/066* (2013.01); *G02C 7/086* (2013.01); *G02C 2202/20* (2013.01); *G02C 2202/24* (2013.01)

(58) Field of Classification Search
  CPC .... G02C 2202/24; G02C 7/063; G02C 7/065; G02C 7/068; G02B 3/04
  USPC ....................................................... 351/159.43
  See application file for complete search history.

(56) References Cited

U.S. PATENT DOCUMENTS

| | | | |
|---|---|---|---|
| 4,704,016 A | 11/1987 | De Carle | |
| 5,359,440 A | 10/1994 | Hamada et al. | |
| 5,507,806 A | 4/1996 | Blake | |
| 5,517,260 A | 5/1996 | Glady et al. | |
| 5,652,638 A | 7/1997 | Roffman et al. | |
| 5,753,092 A | 5/1998 | Hollars et al. | |
| 5,798,027 A | 8/1998 | Lefebvre et al. | |
| 5,982,543 A | 11/1999 | Fiala | |
| 6,045,578 A | 4/2000 | Collins et al. | |
| 6,129,042 A | 10/2000 | Smith et al. | |
| 6,258,218 B1 | 7/2001 | Burton | |
| 6,457,826 B1 | 10/2002 | Lett | |
| 7,025,460 B2 | 4/2006 | Smitth et al. | |
| 7,679,828 B2 | 3/2010 | Munro | |
| 7,976,158 B2 | 7/2011 | Drobe | |
| 8,950,860 B2 | 2/2015 | Tse et al. | |
| 9,234,988 B2 | 1/2016 | Akasaka | |
| 9,411,172 B2 | 8/2016 | Haddock | |
| 9,442,308 B2 | 9/2016 | Dai | |
| RE47,006 E | 8/2018 | To et al. | |
| 10,268,050 B2 | 4/2019 | To et al. | |
| 10,386,654 B2 | 8/2019 | Marshall et al. | |
| 10,901,237 B2* | 1/2021 | Brennan | G02C 7/02 |
| 11,067,832 B2* | 7/2021 | Guillot | G02C 7/06 |
| 2002/0023837 A1 | 2/2002 | Stimson | |
| 2002/0145797 A1 | 10/2002 | Sales | |
| 2003/0058407 A1 | 3/2003 | Aller | |
| 2003/0081172 A1 | 5/2003 | Dreher | |
| 2003/0210466 A1 | 11/2003 | Huang | |
| 2004/0141150 A1 | 7/2004 | Roffman et al. | |
| 2005/0056125 A1 | 3/2005 | Trumper | |
| 2005/0105047 A1 | 5/2005 | Smith, III et al. | |
| 2007/0109494 A1 | 5/2007 | Dreher | |
| 2007/0115431 A1 | 5/2007 | Smith, III et al. | |
| 2007/0159601 A1 | 7/2007 | Ho et al. | |
| 2008/0164147 A1 | 7/2008 | Dogi et al. | |
| 2008/0218687 A1 | 9/2008 | Phillips | |
| 2008/0223715 A1 | 9/2008 | Gibson et al. | |
| 2008/0286458 A1 | 11/2008 | Kirchoff | |
| 2009/0006017 A1 | 1/2009 | Young et al. | |
| 2009/0225435 A1 | 9/2009 | Boettiger et al. | |
| 2010/0036489 A1 | 2/2010 | Lindacher et al. | |
| 2010/0183900 A1 | 7/2010 | Wallin et al. | |
| 2010/0208197 A1 | 8/2010 | Carimalo et al. | |
| 2011/0040377 A1 | 2/2011 | Battis et al. | |
| 2011/0234883 A1 | 9/2011 | Li et al. | |
| 2012/0013030 A1 | 1/2012 | Kadowaki et al. | |
| 2012/0033120 A1 | 2/2012 | Nakamura et al. | |
| 2012/0194780 A1 | 8/2012 | Back | |
| 2013/0033636 A1 | 2/2013 | Pitts et al. | |
| 2014/0016015 A1 | 1/2014 | Miao | |
| 2014/0116986 A1 | 5/2014 | Akasaka | |
| 2014/0211147 A1 | 7/2014 | Wei et al. | |
| 2014/0327875 A1 | 11/2014 | Blum | |
| 2015/0160477 A1 | 6/2015 | Dai | |
| 2015/0309332 A1 | 10/2015 | Hillenbrand et al. | |
| 2015/0378173 A1 | 12/2015 | Contet et al. | |
| 2016/0306192 A1 | 10/2016 | Marshall et al. | |
| 2016/0377884 A1* | 12/2016 | Lau | G02C 7/022 351/159.05 |
| 2017/0131567 A1* | 5/2017 | To | G02C 7/06 |
| 2017/0184875 A1* | 6/2017 | Newman | G02C 7/022 |

FOREIGN PATENT DOCUMENTS

| | | |
|---|---|---|
| CN | 101713871 A | 5/2010 |
| CN | 102692730 A | 9/2012 |
| CN | 102369099 B | 12/2014 |
| CN | 104302295 A | 1/2015 |
| CN | 104678572 A | 6/2015 |
| CN | 105122118 B | 8/2017 |
| CN | 107137402 A | 9/2017 |
| DE | 10 2012 023 478 A1 | 5/2014 |
| EP | 0 367 878 A1 | 5/1990 |
| EP | 0 445 994 A2 | 9/1991 |
| EP | 1 703 313 A1 | 9/2006 |
| EP | 2 762 953 A1 | 8/2014 |
| EP | 3 112 925 A1 | 1/2017 |
| GB | 2 411 290 A | 8/2005 |
| GB | 2462890 A | 3/2010 |
| JP | 6-51248 A | 2/1994 |
| TW | 334518 B | 6/1998 |
| TW | 200422688 A | 11/2004 |
| TW | 201211618 A1 | 3/2012 |
| TW | 201219842 A1 | 5/2012 |
| TW | I507763 B | 11/2015 |
| WO | 2003/054616 A2 | 7/2003 |
| WO | 2004/029324 A1 | 4/2004 |
| WO | 2006/034652 A1 | 4/2006 |
| WO | 2006/087558 A2 | 8/2006 |
| WO | 2007/041796 A1 | 4/2007 |
| WO | 2007/146673 A2 | 12/2007 |
| WO | 2008/104695 A1 | 9/2008 |
| WO | 2009/100257 A2 | 8/2009 |
| WO | 2010/075319 A2 | 7/2010 |
| WO | WO 2011/163668 A2 | 12/2011 |
| WO | WO 2012/034265 A1 | 3/2012 |
| WO | 2012/138426 A2 | 10/2012 |
| WO | 2012/168709 A2 | 12/2012 |
| WO | WO 2015/110886 A1 | 7/2015 |
| WO | 2015/147758 A1 | 10/2015 |
| WO | WO 2018/026697 A1 | 2/2018 |

OTHER PUBLICATIONS

Canadian Office Action issued Aug. 11, 2022 in Canadian Patent Application No. 3,092,607, 4 pages.
Japanese Office Action issued Mar. 7, 2022 in Japanese Patent Application No. 2020-545568 (with English translation), 18 pages.
Combined Taiwanese Office Action and Search Report issued Apr. 11, 2023 in Patent Application No. 108114819 (with English language translation), 16 pages.
Combined Taiwanese Office Action and Search Report issued Apr. 11, 2023 in Patent Application No. 108114822 (with English language translation), 15 pages.

(56) References Cited

OTHER PUBLICATIONS

Office Action issued Jan. 31, 2023, in corresponding Colombian Patent Application No. NC2022/0012154 (with English Translation), 12 pages.

Office Action issued Dec. 12, 2022, in corresponding Colombian Patent Application No. NC2020/0010439 (with English Translation), 24 pages.

"Wearing Contacts With Astigmatism: What You Should Know: Smart Eye Care: Ophthalmologists", Smart Eye Care, Jan. 31, 2018, 4 pages https://www.smarteyecare.nyc/blog/wearing-contacts-with-astigmatism-what-you-should-know.

International Search Report issued on May 27, 2019 in PCT/EP2019/055220 filed on Mar. 1, 2019.

* cited by examiner

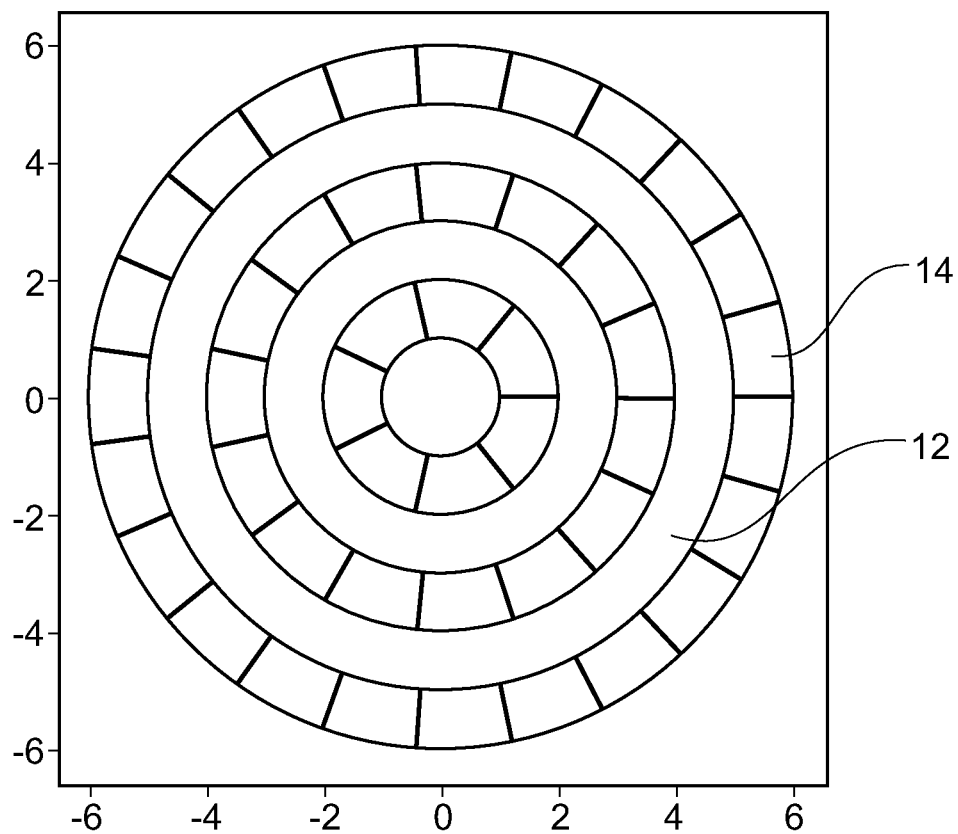
Fig. 13
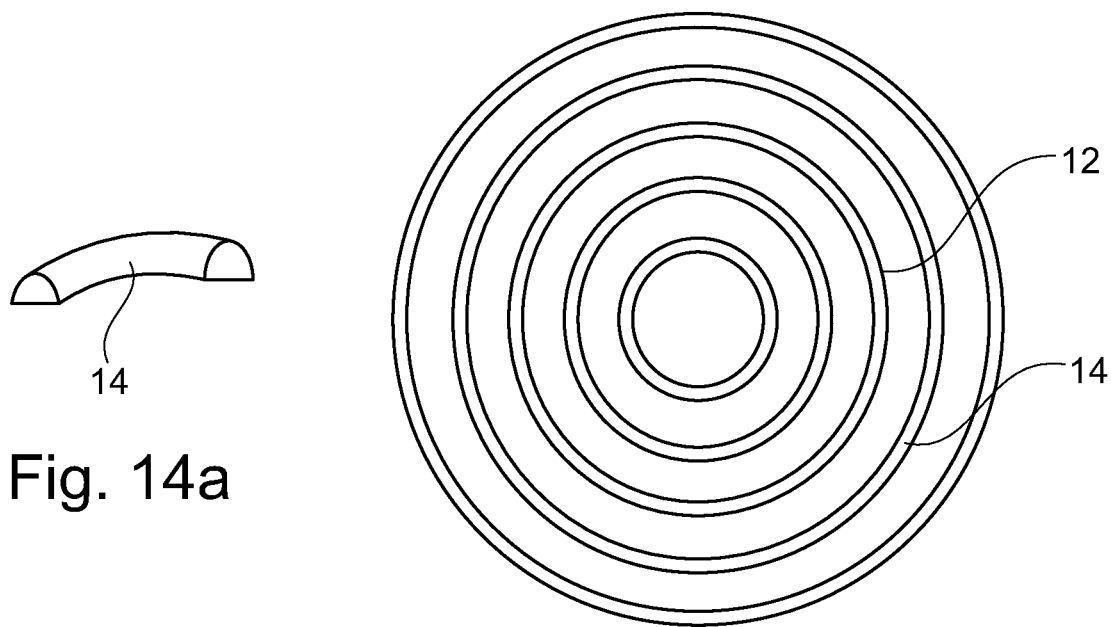
Fig. 14a
Fig. 14b

LENS ELEMENT

CROSS-REFERENCE TO RELATED APPLICATION

The present application is a national stage application of PCT Application No: PCT/EP2019/055220, filed Mar. 1, 2019, which claims priority to European Patent Application Nos. 18305216.6, filed Mar. 1, 2018; 18305217.4, filed Mar. 1, 2018; 18305384.2, filed Mar. 30, 2018; 18305385.9, filed Mar. 30, 2018; 18305435.2, filed Apr. 11, 2018; 18305436.0, filed Apr. 11, 2018; 18305526.8, filed Apr. 26, 2018; and 18305527.6, filed Apr. 26, 2018. The benefit of priority is claimed to each of the foregoing, and the entire contents of each of the foregoing are incorporated herein by reference.

TECHNICAL FIELD

The invention relates to a lens element intended to be worn in front of an eye of a person to suppress progression of abnormal refractions of the eye such as myopia or hyperopia.

BACKGROUND OF THE INVENTION

Myopia of an eye is characterized by the fact that the eye focuses distant objects in front of its retina. Myopia is usually corrected using a concave lens and hyperopia is usually corrected using a convex lens.

It has been observed that some individuals when corrected using conventional single vision optical lenses, in particular children, focus inaccurately when they observe an object which is situated at a short distance away, that is to say, in near vision conditions. Because of this focusing defect on the part of a myopic child which is corrected for his far vision, the image of an object close by is also formed behind his retina, even in the foveal area.

Such focusing defect may have an impact on the progression of myopia of such individuals. One may observe that for most of said individual the myopia defect tends to increase over time.

Foveal vision corresponds to viewing conditions for which the image of an object looked at is formed by the eye in the central zone of the retina, called the foveal zone.

Peripheral vision corresponds to the perception of elements of a scene that are offset laterally relative to the object looked at, the images of said elements being formed on the peripheral area of the retina, away from the foveal zone.

The ophthalmic correction with which an ametropic subject is provided is usually adapted for his foveal vision. However, as is known, the correction has to be reduced for the peripheral vision relative to the correction that is determined for the foveal vision. In particular, studies carried out on monkeys have shown that strong defocusing of the light behind the retina, which occurs away from the foveal zone, may cause the retina of the eye to extend and therefore may cause a myopia defect to increase.

Therefore, it appears that there is a need for a lens element that would suppress or at least slow down progression of abnormal refractions of the eye such as myopia or hyperopia.

SUMMARY OF THE INVENTION

To this end, the invention proposes a lens element intended to be worn in front of an eye of a wearer, in standard wearing conditions, the lens element comprising:

a prescription portion configured to provide to the wearer for foveal vision a first optical power based on the prescription of the wearer for correcting an abnormal refraction of said eye of the wearer;

a plurality of at least three optical elements, at least one optical element having an optical function of not focusing an image on the retina of the eye for peripheral vision so as to slow down the progression of the abnormal refraction of the eye.

Advantageously, having optical elements that are configured to not focus an image on the retina of the wearer for peripheral vision reduce the natural tendency of the retina of the eye to deform, in particular to extend. Therefore, the progression of the abnormal refraction of the eye is slow down.

According to further embodiments which can be considered alone or in combination:

- at least one, for example all, of the optical element has an optical function of focusing an image on a position other than the retina in standard wearing conditions and for peripheral vision; and/or
- at least one optical element has a non-spherical focused optical function in standard wearing conditions and for peripheral vision; and/or
- at least one of the optical elements has a cylindrical power; and/or
- the optical elements are configured so that along at least one section of the lens the mean sphere of optical elements increases from a point of said section towards the peripheral part of said section; and/or
- the optical elements are configured so that along at least one section of the lens the cylinder of optical elements increases from a point of said section towards the peripheral part of said section; and/or
- the optical elements are configured so that along the at least one section of the lens the mean sphere and/or the cylinder of optical elements increases from the center of said section towards the peripheral part of said section; and/or
- the prescription portion comprises an optical center and the optical elements are configured so that along any section passing through the optical center of the lens the mean sphere and/or the cylinder of the optical elements increases from the optical center towards the peripheral part of the lens; and/or
- the prescription portion comprises a far vision reference point, a near vision reference, and a meridian joining the far and near vision reference points, the optical elements are configured so that in standard wearing conditions along any horizontal section of the lens the mean sphere and/or the mean cylinder of the optical elements increases from the intersection of said horizontal section with the meridian towards the peripheral part of the lens; and/or
- the mean sphere and/or the cylinder increase function along the sections are different depending on the position of said section along the meridian; and/or
- the mean sphere and/or the cylinder increase function along the sections are unsymmetrical; and/or
- the optical elements are configured so that in standard wearing condition the at least one section is a horizontal section; and/or
- the mean sphere and/or the cylinder of optical elements increases from a first point of said section towards the peripheral part of said section and decreases from a second point of said section towards the peripheral part of said section, the second point being closer to the peripheral part of said section than the first point; and/or the mean sphere and/or the cylinder increase function along the at least one section is a Gaussian function; and/or the mean sphere and/or the cylinder increase function along the at least one section is a Quadratic function; and/or the optical elements are configured so that the mean focus of the light rays passing through each optical element is at a same distance to the retina; and/or the prescription portion is formed as the portion other than the portions formed as the plurality of optical elements; and/or for every circular zone having a radius comprised between 2 and 4 mm comprising a geometrical center located at a distance of the framing reference that faces the pupil of the user gazing straight ahead in standard wearing conditions greater or equal to said radius+5 mm, the ratio between the sum of areas of the parts of optical elements located inside said circular zone and the area of said circular zone is comprised between 20% and 70%; and/or the at least three optical elements are non-contiguous; and/or at least part, for example all, of the optical elements are located on the front surface of the ophthalmic lens; and/or at least part, for example all, of the optical elements are located on the back surface of the ophthalmic lens; and/or at least part, for example all, of the optical elements are located between the front and the back surfaces of the ophthalmic lens; and/or at least one of the optical elements is a multifocal refractive micro-lens; and/or the at least one multifocal refractive micro-lens comprises an aspherical surface, with or without any rotational symmetry; and/or at least one of the optical elements is a toric refractive micro-lens; and/or the at least one multifocal refractive micro-lens comprises a toric surface; and/or the at least one multifocal refractive micro-lens has a cylindrical power; and/or at least one of the optical elements is made of a birefringent material; and/or at least one of the optical elements is a diffractive lens; and/or the at least one diffractive lens comprises a metasurface structure; and/or at least one optical elements has a shape configured so as to create a caustic in front of the retina of the eye of the person; and/or at least one optical element is a multifocal binary component; and/or at least one optical element is a pixelated lens; and/or at least one optical element is a π-Fresnel lens; and/or at least part, for example all, optical functions comprise high order optical aberrations; and/or the lens element comprises an ophthalmic lens bearing the prescription portion and a clip-on bearing the optical elements adapted to be removably attached to the ophthalmic lens when the lens element is worn; and/or the optical elements have a contour shape being inscribable in a circle having a diameter greater than or equal to 0.8 mm and smaller than or equal to 3.0 mm; and/or the prescription portion is further configured to provide to the wearer in standard wearing conditions and for foveal vision a second optical power different from the first optical power; and/or the difference between the first optical power and the second optical power is greater than or equal to 0.5D; and/or at least one, for example at least 70%, for example all optical elements are active optical element that may be activated by an optical lens controller device; and/or the active optical element comprises a material having a variable refractive index whose value is controlled by the optical lens controller device, and/or the optical elements are positioned on a network; and/or the network is a structured network; and/or the structured network is a squared network or a hexagonal network or a triangle network or an octagonal network; and/or the lens element further comprises at least four optical elements organized in at least two groups of optical elements; and/or each group of optical element is organized in at least two concentric rings having the same center, the concentric ring of each group of optical element being defined by an inner diameter corresponding to the smallest circle that is tangent to at least one optical element of said group and an outer diameter corresponding to the largest circle that is tangent to at least one optical elements of said group; and/or at least part of, for example all the concentric rings of optical elements are centered on the optical center of the surface of the lens element on which said optical elements are disposed; and/or the concentric rings of optical elements have a diameter comprised between 9.0 mm and 60 mm; and/or the distance between two successive concentric rings of optical elements is greater than or equal to 5.0 mm, the distance between two successive concentric rings being defined by the difference between the inner diameter of a first concentric ring and the outer diameter of a second concentric ring, the second concentric ring being closer to the periphery of the lens element.

The invention further relates to a method for determining a lens element adapted to slow down the progression of the abnormal refraction of the eye of a wearer, the method comprising:

a wearer prescription data providing step, during which wearer prescription data relating the prescription of the wearer are provided, a wearing condition data providing step, during which wearing condition data relating to wearing conditions of the lens element by the wearer, a wearer retina data providing step during which wearer retina data relating to the shape of the retina of the wearer in the same reference frame as the wearing conditions are provided, a lens element determining step during which a lens element comprising a prescription portion and a plurality of at least three optical elements is determined so that the prescription portion provides in wearing conditions corresponding to the wearing data and for foveal vision a first optical power based on the prescription of the wearer and at least one optical element has an optical function of not focusing an image on the retina of the eye for peripheral vision.

Advantageously, the method of the invention allows controlling the refraction of the light in peripheral vision through the optical elements using ray tracing. Therefore, one can decide to have the optical elements so as to focus light rays before the retina of the wearer or so as not to focus the light rays. One may consider standard or customized conditions, such as wearing conditions or the shape of the retina.

Furthermore, the method of the invention allows controlling the average focusing or point or min and max range by optical element at a certain distance from the retina in specific wearing condition and taking into account the retina of the wearer and depending on the eccentricity.

For example, for a spherical optical element the method of the invention allows determining the peripheral astigmatic image whose best focus is at 2 D of the retina.

For example, for a toric optical element the method of the invention allows determining the peripheral point image whose best focus is constant by 3 D whatever the position of the optical element.

According to further embodiments which can be considered alone or in combination:
- during the lens element determining step at least 50%, for example at least 80%, of the optical elements are determined so as to focus an image at a given distance of the retina; and/or
- during the lens element determining step at least 50%, for example at least 80%, of the optical elements are determined so as to focus an image at a same distance of the retina along the axis linking a reference point of each optical element and the center of the pupil of the wearer; and/or
- the wearing condition data provided during the wearing condition data providing step correspond to standard wearing conditions; and/or
- the wearing condition data provided during the wearing condition data providing step correspond to wearing conditions measured on the wearer; and/or
- the wearer retina data provided during the wearer retina data providing step correspond to standard retina shape; and/or
- the wearer retina data provided during the wearer retina data providing step correspond to the shape of the retina measured on the wearer; and/or
- the method further comprises a front surface data providing step during which front surface data representative of the front surface of the lens element are provided, and wherein during the lens element determining step the shape of the back surface and the optical elements to be placed on the front surface are determined so that the prescription portion provides in wearing conditions corresponding to the wearing data and for foveal vision a first optical power based on the prescription of the wearer and at least one optical element has an optical function of not focusing an image on the retina of the eye for peripheral vision.

BRIEF DESCRIPTION OF THE DRAWINGS

Non-limiting embodiments of the invention will now be described with reference to the accompanying drawing wherein:

FIGS. 8 to 10a show, diagrammatically, optical systems of eye and lens;

FIGS. 13 to 17 illustrate different organizations of optical elements according to different embodiments of the invention.

Elements in the figures are illustrated for simplicity and clarity and have not necessarily been drawn to scale. For example, the dimensions of some of the elements in the figure may be exaggerated relative to other elements to help to improve the understanding of the embodiments of the present invention.

DETAILED DESCRIPTION OF EMBODIMENTS OF THE INVENTION

The invention relates to a lens element intended to be worn in front of an eye of a wearer.

In the reminder of the description, terms like «up », «bottom », «horizontal », «vertical », «above », «below », «front », «rear » or other words indicating relative position may be used. These terms must be understood in the wearing conditions of the lens element.

In the context of the present invention, the term "lens element" can refer to an uncut optical lens or a spectacle optical lens edged to fit a specific spectacle frame or an ophthalmic lens and an optical device adapted to be positioned on the ophthalmic lens. The optical device may be positioned on the front or back surface of the ophthalmic lens. The optical device may be an optical patch. The optical device may be adapted to be removably positioned on the ophthalmic lens for example a clip configured to be clipped on a spectacle frame comprising the ophthalmic lens.

A lens element 10 according to the invention is adapted for a wearer and intended to be worn in front of an eye of said wearer.

Figure 1:
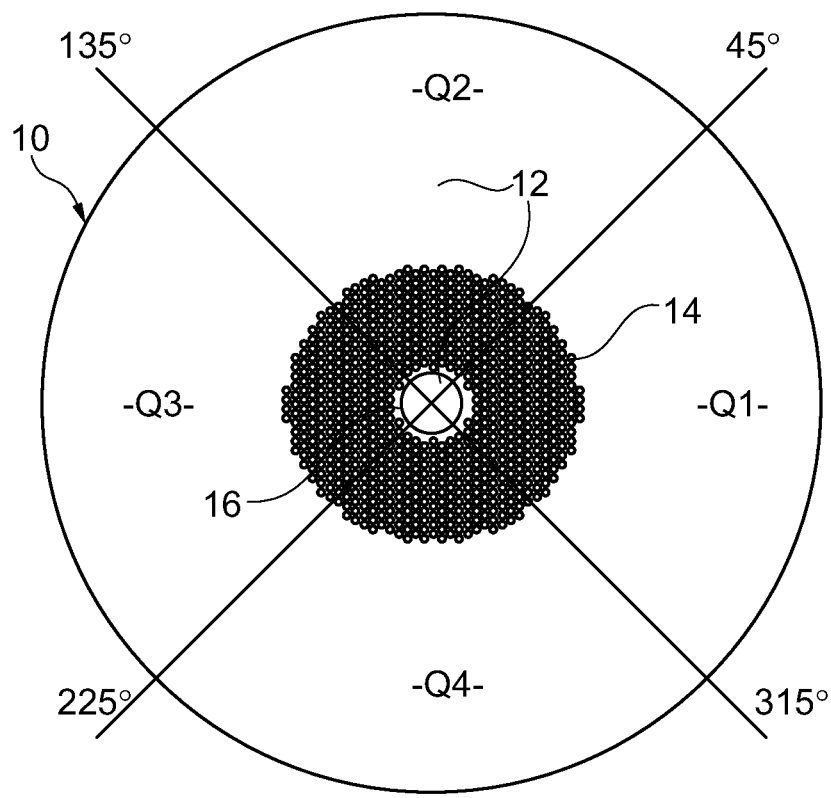
FIG. 1 is a plan view of a lens element according to the invention.

As represented on FIG. 1, a lens element 10 according to the invention comprises:
a prescription portion 12, and
a plurality of at least three optical elements 14.

The prescription portion 12 is configured to provide to the wearer in standard wearing conditions and for foveal vision a first optical power based on the prescription of the wearer for correcting an abnormal refraction of said eye of the wearer.

The wearing conditions are to be understood as the position of the lens element with relation to the eye of a wearer, for example defined by a pantoscopic angle, a Cornea to lens distance, a Pupil-cornea distance, a centre of rotation of the eye (CRE) to pupil distance, a CRE to lens distance and a wrap angle.

The Cornea to lens distance is the distance along the visual axis of the eye in the primary position (usually taken to be the horizontal) between the cornea and the back surface of the lens; for example equal to 12 mm.

The Pupil-cornea distance is the distance along the visual axis of the eye between its pupil and cornea; usually equal to 2 mm.

The CRE to pupil distance is the distance along the visual axis of the eye between its center of rotation (CRE) and cornea; for example equal to 11.5 mm.

The CRE to lens distance is the distance along the visual axis of the eye in the primary position (usually taken to be the horizontal) between the CRE of the eye and the back surface of the lens, for example equal to 25.5 mm.

The pantoscopic angle is the angle in the vertical plane, at the intersection between the back surface of the lens and the visual axis of the eye in the primary position (usually taken to be the horizontal), between the normal to the back surface of the lens and the visual axis of the eye in the primary position; for example equal to 8°.

The wrap angle is the angle in the horizontal plane, at the intersection between the back surface of the lens and the visual axis of the eye in the primary position (usually taken to be the horizontal), between the normal to the back surface of the lens and the visual axis of the eye in the primary position for example equal to 0°.

An example of standard wearer condition may be defined by a pantoscopic angle of 8°, a Cornea to lens distance of 12 mm, a Pupil-cornea distance of 2 mm, a CRE to pupil distance of 11.5 mm, a CRE to lens distance of 25.5 mm and a wrap angle of 0°.

The term "prescription" is to be understood to mean a set of optical characteristics of optical power, of astigmatism, of prismatic deviation, determined by an ophthalmologist or optometrist in order to correct the vision defects of the eye, for example by means of a lens positioned in front of his eye. For example, the prescription for a myopic eye comprises the values of optical power and of astigmatism with an axis for the distance vision.

Although the invention is not directed to progressive lenses, the wording used in this description is illustrated in FIGS. 1 to 10 of document WO2016/146590 for a progressive lens. The skilled person can adapt the definitions for single vision lenses.

A progressive lens comprises at least one but preferably two non-rotationally symmetrical aspheric surfaces, for instance but not limited to, progressive surface, regressive surface, toric or atoric surfaces.

As is known, a minimum curvature $CURV_{min}$ is defined at any point on an aspherical surface by the formula:

$$CURV_{min} = \frac{1}{R_{max}}$$

where Rmax is the local maximum radius of curvature, expressed in meters and CURVmin is expressed in dioptres.

Similarly, a maximum curvature $CURV_{max}$ can be defined at any point on an aspheric surface by the formula:

$$CURV_{max} = \frac{1}{R_{min}}$$

where Rmin is the local minimum radius of curvature, expressed in meters and CURVmax is expressed in dioptres.

It can be noticed that when the surface is locally spherical, the local minimum radius of curvature Rmin and the local maximum radius of curvature Rmax are the same and, accordingly, the minimum and maximum curvatures CURVmin and CURVmax are also identical. When the surface is aspherical, the local minimum radius of curvature Rmin and the local maximum radius of curvature Rmax are different.

From these expressions of the minimum and maximum curvatures CURVmin and CURVmax, the minimum and maximum spheres labeled SPHmin and SPHmax can be deduced according to the kind of surface considered.

When the surface considered is the object side surface (also referred to as the front surface), the expressions are the following:

$$SPH_{min} = (n-1)*CURV_{min} = \frac{n-1}{R_{max}}, \text{ and}$$

$$SPH_{min} = (n-1)*CURV_{min} = \frac{n-1}{R_{max}}$$

where n is the refractive index of the constituent material of the lens.

If the surface considered is an eyeball side surface (also referred to as the back surface), the expressions are the following:

$$SPH_{min} = (1-n)*CURV_{min} = \frac{1-n}{R_{max}} \text{ and}$$

$$SPH_{max} = (1-n)*CURV_{max} = \frac{1-n}{R_{min}}$$

where n is the refractive index of the constituent material of the lens.

As is well known, a mean sphere SPHmean at any point on an aspherical surface can also be defined by the formula:

$$SPH_{mean} = \frac{1}{2}(SPH_{min} + SPH_{max})$$

The expression of the mean sphere therefore depends on the surface considered:

if the surface is the object side surface, $$SPH_{mean} = \frac{n-1}{2}\left(\frac{1}{R_{min}} + \frac{1}{R_{max}}\right)$$

if the surface is an eyeball side surface, $$SPH_{mean} = \frac{1-n}{2}\left(\frac{1}{R_{min}} + \frac{1}{R_{max}}\right)$$

a cylinder CYL is also defined by the formula $CYL = |SPH_{max} - SPH_{min}|$.

The characteristics of any aspherical face of the lens may be expressed by the local mean spheres and cylinders. A surface can be considered as locally non-spherical when the cylinder is at least 0.25 diopters.

Figure 7A:
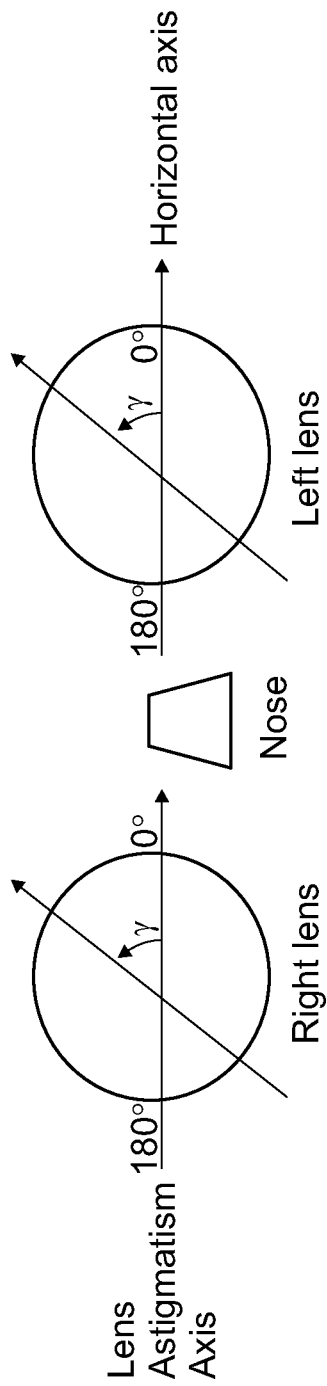
FIG. 7a illustrates the astigmatism axis γ of a lens in the TABO convention.
Figure 7B:
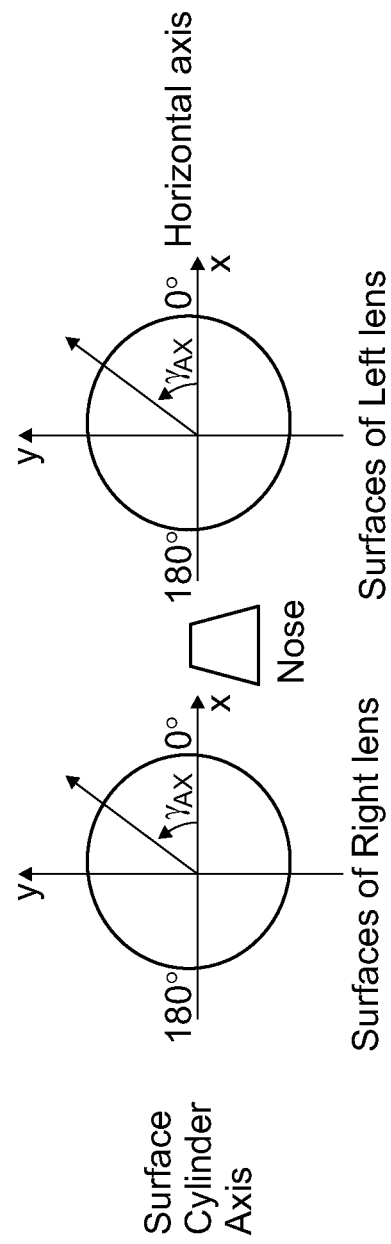
FIG. 7b illustrates the cylinder axis $\gamma_{AX}$ in a convention used to characterize an aspherical surface.

For an aspherical surface, a local cylinder axis γAX may further be defined. FIG. 7a illustrates the astigmatism axis γ as defined in the TABO convention and FIG. 7b illustrates the cylinder axis γAX in a convention defined to characterize an aspherical surface.

The cylinder axis γAX is the angle of the orientation of the maximum curvature CURVmax with relation to a reference axis and in the chosen sense of rotation. In the above defined convention, the reference axis is horizontal (the angle of this reference axis is)0°) and the sense of rotation is counter clockwise for each eye, when looking at the wearer (0≤γAX≤180°). An axis value for the cylinder axis γAX of +45° therefore represents an axis oriented obliquely, which when looking at the wearer, extends from the quadrant located up on the right to the quadrant located down on the left.

Moreover, a progressive multifocal lens may also be defined by optical characteristics, taking into consideration the situation of the person wearing the lenses.

Figure 8:
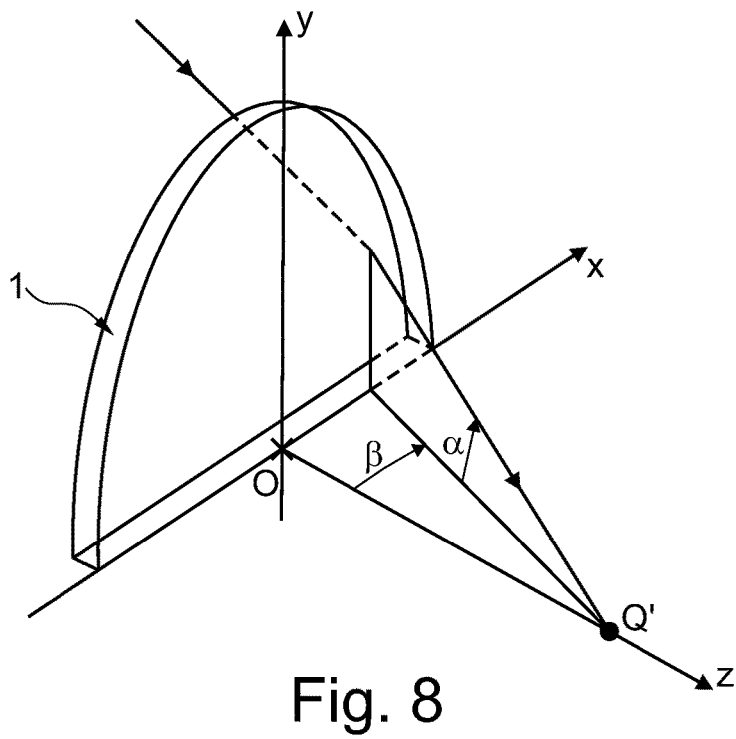
Figure 9:
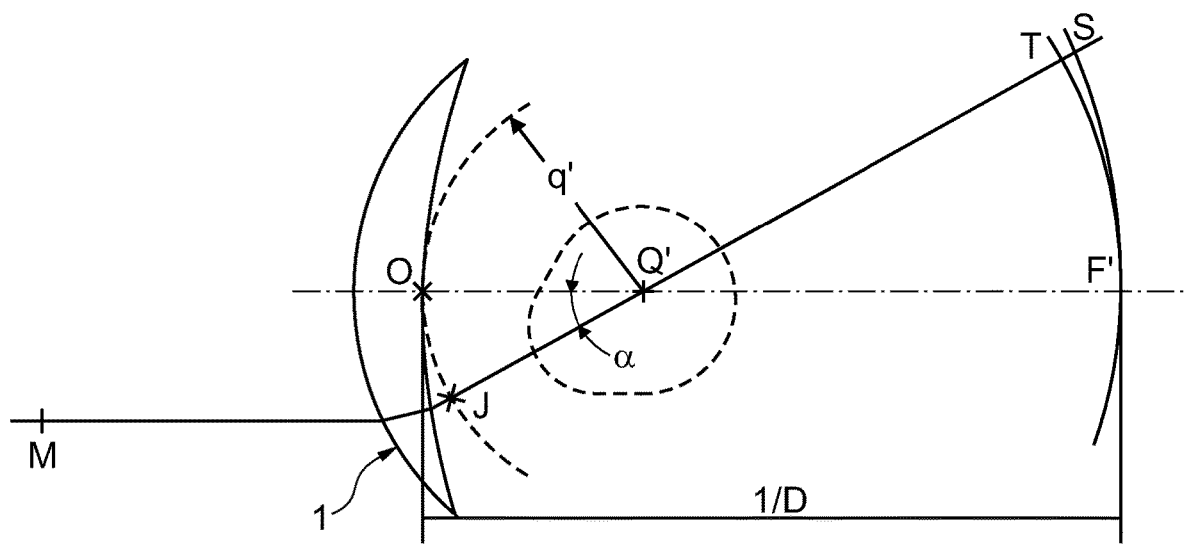

FIGS. 8 and 9 are diagrammatic illustrations of optical systems of eye and lens, thus showing the definitions used in the description. More precisely, FIG. 8 represents a perspective view of such a system illustrating parameters α and β used to define a gaze direction. FIG. 9 is a view in the vertical plane parallel to the antero-posterior axis of the wearer's head and passing through the center of rotation of the eye in the case when the parameter β is equal to 0.

The center of rotation of the eye is labeled Q'. The axis Q'F', shown on FIG. 9 in a dot-dash line, is the horizontal axis passing through the center of rotation of the eye and extending in front of the wearer—that is the axis Q'F' corresponding to the primary gaze view. This axis cuts the aspherical surface of the lens on a point called the fitting cross, which is present on lenses to enable the positioning of lenses in a frame by an optician. The point of intersection of the rear surface of the lens and the axis Q'F' is the point O. O can be the fitting cross if it is located on the rear surface. An apex sphere, of center Q', and of radius q', is tangential to the rear surface of the lens in a point of the horizontal axis. As examples, a value of radius q' of 25.5 mm corresponds to a usual value and provides satisfying results when wearing the lenses.

Figure 3:
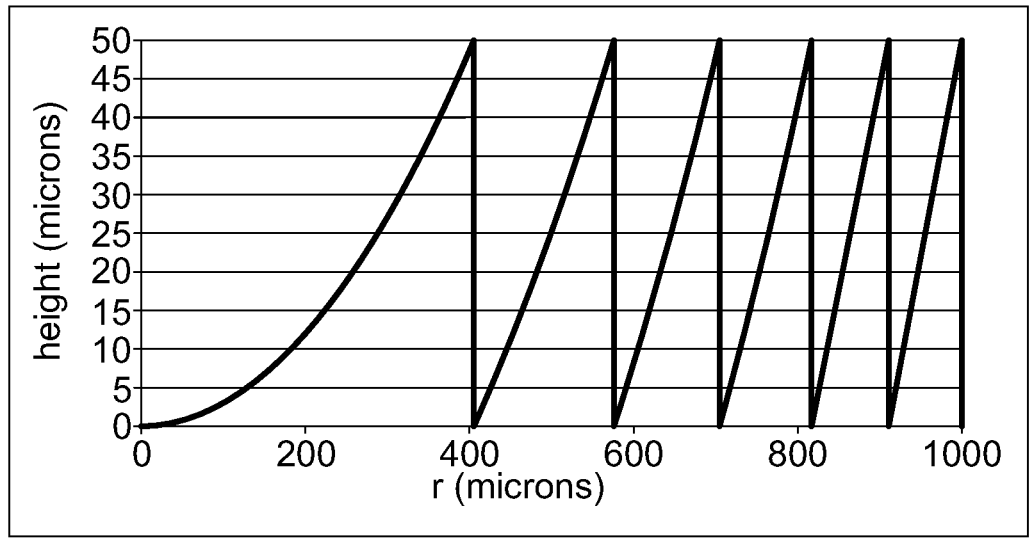
FIG. 3 represents an example of a Fresnel height profile.

A given gaze direction—represented by a solid line on FIG. 8—corresponds to a position of the eye in rotation around Q' and to a point J of the apex sphere; the angle β is the angle formed between the axis Q'F' and the projection of the straight line Q'J on the horizontal plane comprising the axis Q'F'; this angle appears on the scheme on FIG. 3. The angle α is the angle formed between the axis Q'J and the projection of the straight line Q'J on the horizontal plane comprising the axis Q'F'; this angle appears on the scheme on FIGS. 8 and 9. A given gaze view thus corresponds to a point J of the apex sphere or to a couple (α, β). The more the value of the lowering gaze angle is positive, the more the gaze is lowering and the more the value is negative, the more the gaze is rising.

In a given gaze direction, the image of a point M in the object space, located at a given object distance, is formed between two points S and T corresponding to minimum and maximum distances JS and JT, which would be the sagittal and tangential local focal lengths. The image of a point in the object space at infinity is formed, at the point F'. The distance D corresponds to the rear frontal plane of the lens.

Ergorama is a function associating to each gaze direction the usual distance of an object point. Typically, in far vision following the primary gaze direction, the object point is at infinity. In near vision, following a gaze direction essentially corresponding to an angle α of the order of 35° and to an angle β of the order of 5° in absolute value toward the nasal side, the object distance is of the order of 30 to 50 cm. For more details concerning a possible definition of an ergorama, U.S. Pat. No. 6,318,859 may be considered. This document describes an ergorama, its definition and its modeling method. For a method of the invention, points may be at infinity or not. Ergorama may be a function of the wearer's ametropia or wearer's addition.

Using these elements, it is possible to define a wearer optical power and astigmatism, in each gaze direction. An object point M at an object distance given by the ergorama is considered for a gaze direction (α,β). An object proximity ProxO is defined for the point M on the corresponding light ray in the object space as the inverse of the distance MJ between point M and point J of the apex sphere:

ProxO=1/MJ

This enables to calculate the object proximity within a thin lens approximation for all points of the apex sphere, which is used for the determination of the ergorama. For a real lens, the object proximity can be considered as the inverse of the distance between the object point and the front surface of the lens, on the corresponding light ray.

For the same gaze direction (α,β), the image of a point M having a given object proximity is formed between two points S and T which correspond respectively to minimal and maximal focal distances (which would be sagittal and tangential focal distances). The quantity ProxI is called image proximity of the point M:

$$ProxI = \frac{1}{2}\left(\frac{1}{JT} + \frac{1}{JS}\right)$$

By analogy with the case of a thin lens, it can therefore be defined, for a given gaze direction and for a given object proximity, i.e. for a point of the object space on the corresponding light ray, an optical power Pui as the sum of the image proximity and the object proximity.

Pui=Pr oxO+Pr oxI

With the same notations, an astigmatism Ast is defined for every gaze direction and for a given object proximity as:

$$Ast = \left|\frac{1}{JT} - \frac{1}{JS}\right|$$

This definition corresponds to the astigmatism of a ray beam created by the lens. It can be noticed that the definition gives, in the primary gaze direction, the classical value of astigmatism. The astigmatism angle, usually called axis, is the angle γ. The angle γ is measured in the frame {Q', xm, ym, zm} linked to the eye. It corresponds to the angle with which the image S or T i formed depending on the convention used with relation to the direction zm in the plane {Q', zm, ym}.

The optical power and astigmatism have been defined for foveal vision considering the light ray passing by the center of rotation of the eye of the wearer.

Figure 10A:
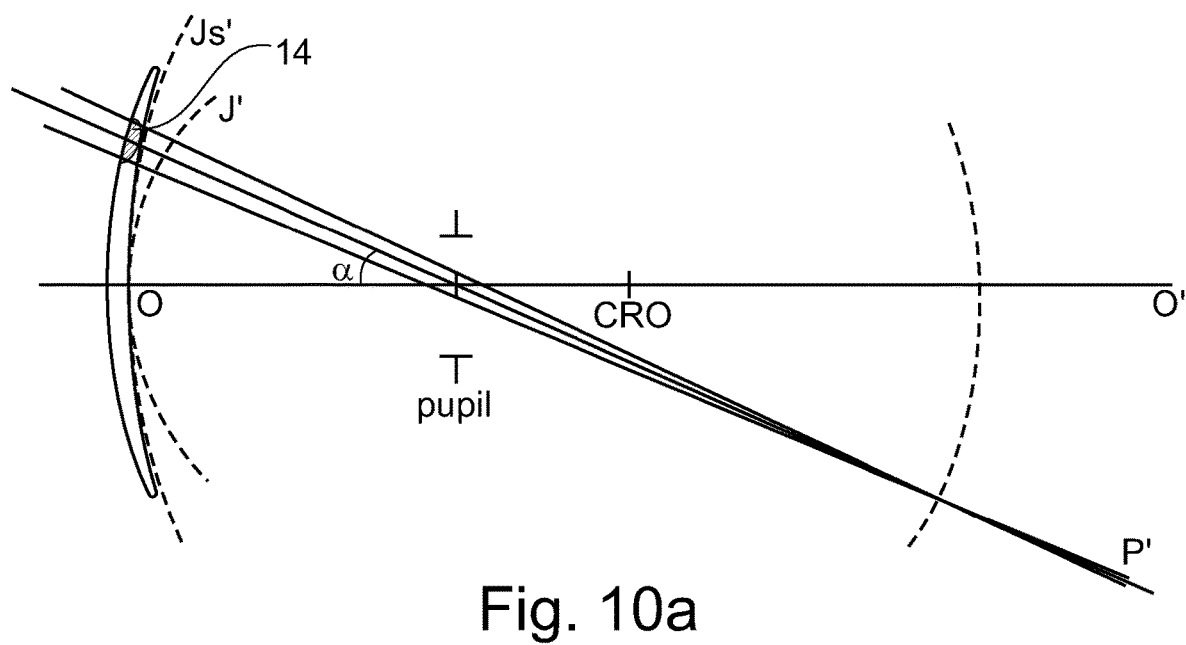

The optical power and astigmatism may be defined in a similar manner for peripheral vision considering the light ray passing by the center of the pupil of the wearer as illustrated on FIG. 10a.

Possible definitions of the optical power and the astigmatism of the lens, in the wearing conditions, can thus be calculated as explained in the article by B. Bourdoncle et al., entitled "Ray tracing through progressive ophthalmic lenses", 1990 International Lens Design Conference, D. T. Moore ed., Proc. Soc. Photo. Opt. Instrum. Eng.

The prescription portion 12 may further be configured to provide to the wearer for foveal vision a second optical power for foveal vision different from the first optical power based on the prescription of the wearer.

In the sense of the invention, the two optical powers are considered different when the difference between the two optical powers is greater than or equal to 0.5 D.

When the abnormal refraction of the eye of the person corresponds to myopia the second optical power is greater than the first optical power.

When the abnormal refraction of the eye of the person corresponds to hyperopia, the second optical power is smaller than the first optical power.

The prescription portion is preferably formed as the portion other than the portions formed as the plurality of optical elements. In other words, the prescription portion is the complementary portion to the portions formed by the plurality of optical elements.

The prescription portion may have a continuous variation of optical power. For example, the prescription portion may have a progressive addition design.

The optical design of the prescription portion may comprise
 a fitting cross where the optical power is negative,
 a first zone extending in the temporal side of the prescription portion when the lens element is being worn by a wearer. In the first zone, the optical power increases when moving towards the temporal side, and over the nasal side of the lens, the optical power of the ophthalmic lens is substantially the same as at the fitting cross.

Such optical design is disclosed in greater details in WO2016/107919.

Alternatively, the optical power in the prescription portion may comprise at least one discontinuity.

As represented on FIG. 1, the lens element may be divided in five complementary zones, a central zone 16 having an optical power equal to the first refractive power and four quadrants Q1, Q2, Q3, Q4 at 45°, at least one of the quadrant having at least a point where the optical power is equal to the second optical power.

In the sense of the invention the "quadrants at 45°" are to be understood as equal angular quadrant of 90° oriented in the directions 45°/225° and 135°/315° according to the TABO convention as illustrated on FIG. 1.

Preferably, the central zone 16 comprises a framing reference point that faces the pupil of the wearer gazing straight ahead in standard wearing conditions and has a diameter greater than or equal to 4 mm and smaller than or equal to 22 mm.

According to an embodiment of the invention at least the lower part quadrant Q4 has a second optical power for central vision different from the first optical power corresponding to the prescription for correcting the abnormal refraction.

For example, the prescription portion has a progressive addition dioptric function. The progressive addition dioptric function may extend between the upper part quadrant Q2 and the lower part quadrant Q4.

Advantageously, such configuration allows compensation of accommodative lag when the person looks for example at near vision distances thanks to the addition of the lens.

According to an embodiment, at least one of the temporal Q3 and nasal Q1 quadrant has a second optical power. For example, the temporal Q3 quadrant has a variation of power with the eccentricity of the lens.

Advantageously, such configuration increases the efficiency of the abnormal refraction control in peripheral vision with even more effect in horizontal axis.

According to an embodiment, the four quadrants Q1, Q2, Q3 and Q4 have a concentric power progression.

According to an embodiment of the invention, the central zone of the lens corresponding to a zone centered on the optical center of the lens element does not comprise optical elements. For example, the lens element may comprise an empty zone centered on the optical center of said lens element and having a diameter equal to 0.9 mm which does not comprise optical elements.

The optical center of the lens element may correspond to the fitting point of the lens.

Alternatively, the optical elements may be disposed on the entire surface of the lens element.

At least one optical element of the plurality of at least three optical elements 14, has an optical function of not focusing an image on the retina of the eye of the wearer for peripheral vision.

In the sense of the invention "focusing" is to be understood as producing a focusing spot with a circular section that can be reduced to a point in the focal plane.

Advantageously, such optical function of the optical element reduces the deformation of the retina of the eye of the wearer in peripheral vision, allowing to slow down the progression of the abnormal refraction of the eye of the person wearing the lens element.

The optical elements may be as represented on FIG. 1, non-contiguous optical elements.

In the sense of the invention, two optical elements located on a surface of the lens element are non-contiguous if along all the paths supported by said surface that links the two optical elements one does reach the basis surface on which the optical elements are located.

When the surface on which the at least two optical elements are located is spherical, the basis surface corresponds to said spherical surface. In other words, two optical elements located on a spherical surface are non-contiguous if along all paths linking them and supported by said spherical surface one reaches the spherical surface.

When the surface on which the at least two optical elements are located is non-spherical, the basis surface corresponds to the local spherical surface that best fit said non-spherical surface. In other words, two optical elements located on a non-spherical surface are non-contiguous if along all paths linking them and supported by said non-spherical surface one reaches the spherical surface that best fit the non-spherical surface.

Figure 12:
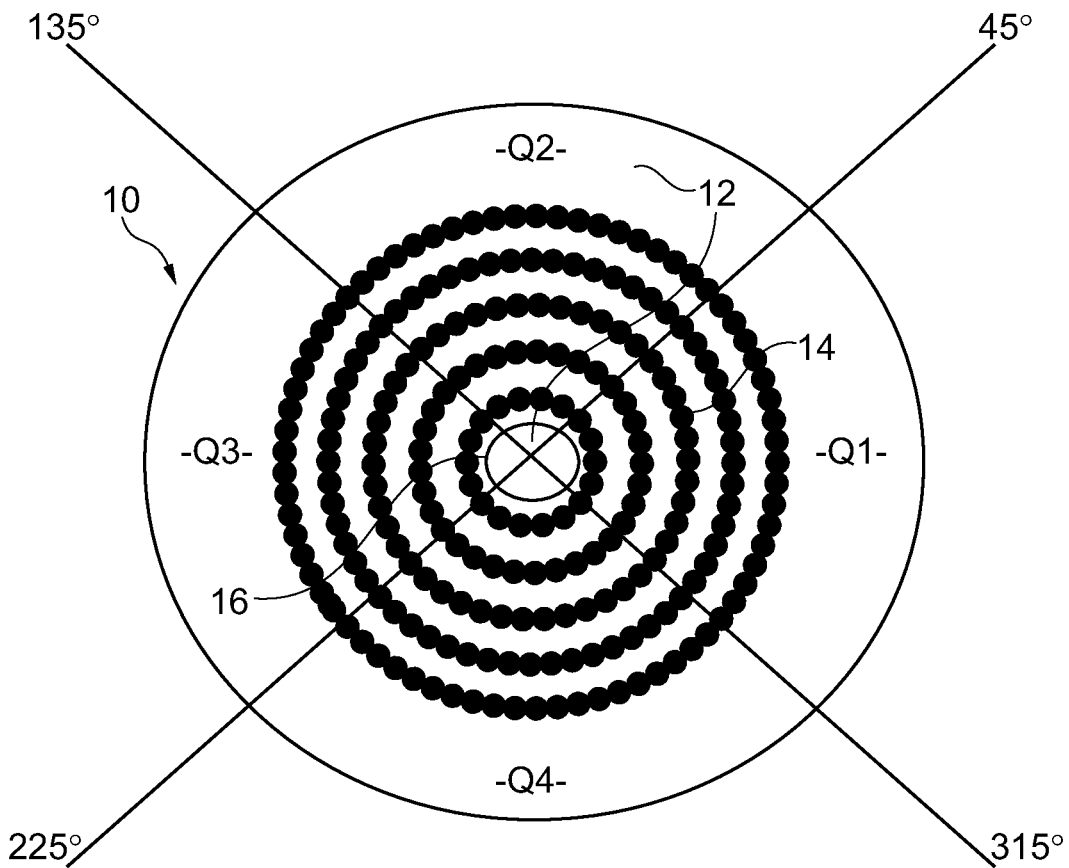
FIG. 12 is a plan view of a lens element according to an embodiment of the invention.
Figure 15:
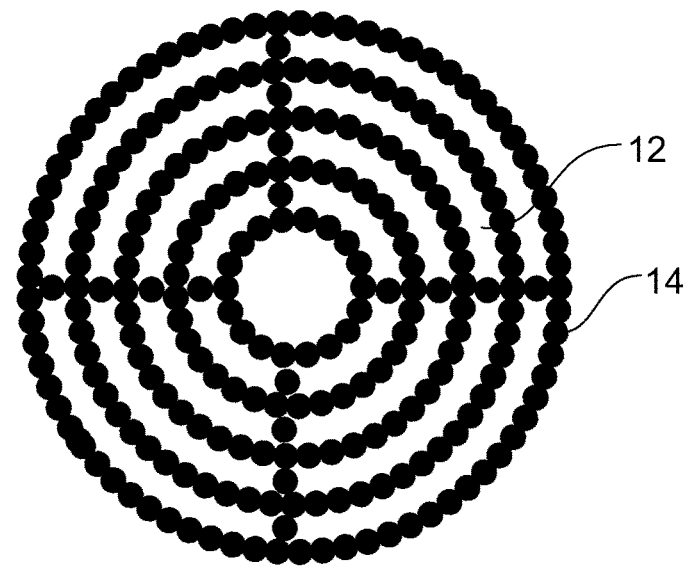

As illustrated on FIG. 12, the plurality of optical elements 14 may comprises at least two optical elements that are contiguous.

In the sense of the invention, two optical elements located on a surface of the lens element are contiguous if there is a path supported by said surface that links the two optical elements and if along said path one does not reach the basis surface on which the optical elements are located.

When the surface on which the at least two optical elements are located is spherical, the basis surface corresponds to said spherical surface. In other words, two optical elements located on a spherical surface are contiguous if there is a path supported by said spherical surface and linking them and if along said path one may not reach the spherical surface.

When the surface on which the at least two optical elements are located is non-spherical, the basis surface corresponds to the local spherical surface that best fit said non-spherical surface. In other words, two optical elements located on a non-spherical surface are contiguous if there is a path supported by said non-spherical surface and linking them and if along said path one may not reach the spherical surface that best fit the non-spherical surface.

Advantageously, having contiguous optical elements helps improving the aesthetic of the lens element and is easier to manufacture.

At least one, preferably all of the, optical element of the plurality of optical elements 14, has an optical function of not focusing an image on the retina of the eye of the wearer, in particular for peripheral vision and preferably for central and peripheral vision.

Advantageously, such optical function of the optical element reduces the deformation of the retina of the eye of the wearer in peripheral vision, allowing to slow down the progression of the abnormal refraction of the eye of the person wearing the lens element.

According to a preferred embodiment of the invention, the at least two contiguous optical elements are independent.

In the sense of the invention, two optical elements are considered as independent if producing independent images.

In particular, when illuminated by a parallel beam "in central vision", each "independent contiguous optical element" forms on a plane in the image space a spot associated with it. In other words, when one of the "optical element" is hidden, the spot disappears even if this optical element is contiguous with another optical element.

For the classic Fresnel ring (carrying a single power) as disclosed in U.S. Pat. No. 7,976,158, said Fresnel ring produces a single spot whose position is not changed if one conceals a small part of the ring. The Fresnel ring cannot therefore be considered as a succession of "independent contiguous optical element". According to an embodiment of the invention, the optical elements have specific sizes. In particular, the optical elements have a contour shape being inscribable in a circle having a diameter greater than or equal to 0.8 mm and smaller than or equal to 3.0 mm, preferably greater than or equal to 1.0 mm and smaller than 2.0 mm.

According to embodiments of the invention, the optical elements are positioned on a network.

The network on which the optical elements are positioned may be a structured network as illustrated on FIGS. 12 to 16.

In the embodiments illustrated on FIGS. 12 to 15 the optical elements are positioned along a plurality of concentric rings.

The concentric rings of optical elements may be annular rings.

According to an embodiment of the invention, the lens element further comprises at least four optical elements. The at least four optical elements are organized in at least two groups of optical elements, each group of optical element being organized in at least two concentric rings having the same center, the concentric ring of each group of optical element being defined by an inner diameter and an outer diameter.

According to an embodiment of the invention, the optical elements of each group of optical elements are contiguous.

The inner diameter of a concentric ring of each group of optical elements corresponds to the smallest circle that is tangent to at least one optical element of said group of optical elements. The outer diameter of a concentric ring of optical element corresponds to the largest circle that is tangent to at least one optical element of said group.

For example, the lens element may comprise n rings of optical elements, $f_{inner\ 1}$ referring to the inner diameter of the concentric ring which is the closest to the optical center of the lens element, $f_{outer\ 1}$ referring to the outer diameter of the concentric ring which is the closest to the optical center of the lens element, $f_{inner\ n}$ referring to the inner diameter of the ring which is the closest to the periphery of the lens element, and $f_{outer\ n}$ referring to the outer diameter of the concentric ring which is the closest to the periphery of the lens element.

The distance $D_i$ between two successive concentric rings of optical elements i and i+1 may be expressed as:

$$D_i = |f_{inner\ i+1} - f_{outer\ i}|,$$

wherein $f_{outer\ i}$ refers to the outer diameter of a first ring of optical elements i and $f_{inner\ i+1}$ refers to the inner diameter of a second ring of optical elements i+1 that is successive to the first one and closer to the periphery of the lens element.

According to another embodiment of the invention, the optical elements are organized in concentric rings centered on the optical center of the surface of the lens element on which the optical elements are disposed and linking the geometrical center of each optical element.

For example, the lens element may comprise n rings of optical elements, $f_1$ referring to the diameter of the ring which is the closest to the optical center of the lens element and $f_n$ referring to the diameter of the ring which is the closest to the periphery of the lens element.

The distance $D_i$ between two successive concentric rings of optical elements i and i+1 may be expressed as:

$$D_i = \left| f_{i+1} - f_i - \frac{d_{i+1}}{2} - \frac{d_i}{2} \right|,$$

wherein $f_i$ refers to the diameter of a first ring of optical elements i and $f_{i+i}$ refers to the diameter of a second ring of optical elements i+1 that is successive to the first one and closer to the periphery of the lens element, and wherein $d_i$ refers to the diameter of the optical elements on the first ring of optical elements and $d_{i+1}$ refers to the diameter of the optical elements on the second ring of optical elements that is successive to the first ring and closer to the periphery of the lens element. The diameter of the optical element corresponds to the diameter of the circle in which the contour shape of the optical element is inscribed.

The concentric rings of optical elements may be annular rings.

Advantageously, the optical center of the lens element and the center of the concentric rings of optical elements coincide. For example, the geometrical center of the lens element, the optical center of the lens element, and the center of the concentric rings of optical elements coincide.

In the sense of the invention, the term coincide should be understood as being really close together, for example distanced by less than 1.0 mm.

The distance $D_i$ between two successive concentric rings may vary according to i. For example, the distance $D_i$ between two successive concentric rings may vary between 2.0 mm and 5.0 mm.

According to an embodiment of the invention, the distance $D_i$ between two successive concentric rings of optical elements is greater than 2.00 mm, preferably 3.0 mm, more preferably 5.0 mm.

Advantageously, having the distance $D_i$ between two successive concentric rings of optical elements greater than 2.00 mm allows managing a larger refraction area between these rings of optical elements and thus provides better visual acuity.

Considering an annular zone of the lens element having an inner diameter greater than 9 mm and an outer diameter smaller than 57 mm, having a geometrical center located at a distance of the optical center of the lens element smaller than 1 mm, the ratio between the sum of areas of the parts of optical elements located inside said circular zone and the area of said circular zone is comprised between 20% and 70%, preferably between 30% and 60%, and more preferably between 40% and 50%.

In other words, the inventors have observed that for a given value of the abovementioned ratio, the organization of optical elements in concentric rings, where these rings are spaced by a distance greater than 2.0 mm, allows providing annular zones of refractive area easier to manufacture than the refractive area managed when optical element are disposed in hexagonal network or randomly disposed on the surface of the lens element. thereby provide a better correction of the abnormal refraction of the eye and thus a better visual acuity.

According to an embodiment of the invention, the diameter di of all optical elements of the lens element are identical.

According to an embodiment of the invention, the distance $D_i$ between two successive concentric rings i and i+1 may increase when i increases towards the periphery of the lens element.

The concentric rings of optical elements may have a diameter comprised between 9 mm and 60 mm.

According to an embodiment of the invention, the lens element comprises optical elements disposed in at least 2 concentric rings, preferably more than 5, more preferably more than 10 concentric rings. For example, the optical elements may be disposed in 11 concentric rings centered on the optical center of the lens.

On FIG. 12, the optical elements are micro-lenses positioned along a set of 5 concentric rings. The optical power and/or cylinder of the micro-lenses may be different depending on their position along the concentric rings.

On FIG. 13, the optical elements correspond to different sectors of concentric circles.

On FIGS. 14b, the optical elements correspond to part of pure cylindrical concentric rings as illustrated on FIG. 14a. In this example, the optical elements have constant power but a variable cylindrical axis.

According to an embodiment of the invention, for example illustrated on FIG. 12, the lens element may further comprise optical elements 14 positioned radially between two concentric rings. In the example illustrated on FIG. 12, only 4 optical elements are placed between two concentric rings, however, may more optical elements may be positioned between both rings.

The optical elements may be placed on a structed network that is a squared network or a hexagonal network or a triangle network or an octagonal network.

Figure 16:
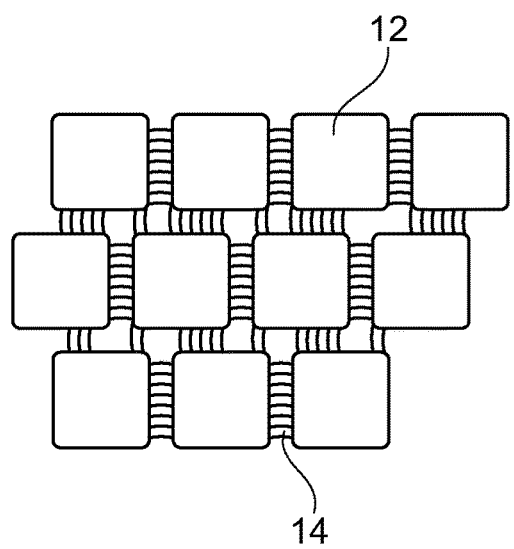

Such embodiment of the invention is illustrated on FIG. 16 where the optical elements 14 are place on a squared network.

Figure 17:
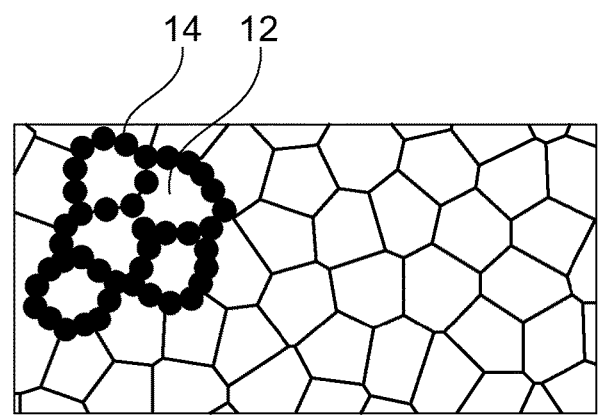

Alternatively, the optical elements may be placed on a random structure network such as a Voronoid network as illustrated on FIG. 17.

Advantageously, having the optical elements placed on a random structure limits the risk of light scattering or diffraction.

Different junctions between two contiguous optical elements are possible.

Figure 18A:
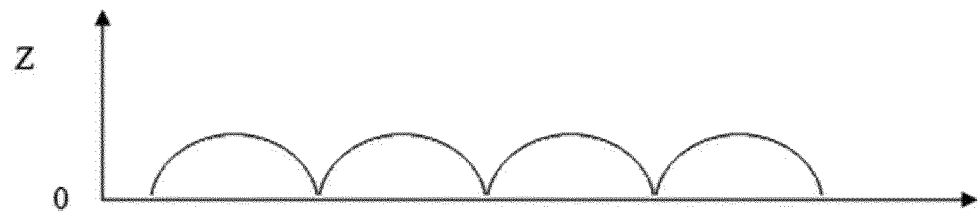
FIGS. 18a to 19b illustrate different types of junction between optical elements according to the invention.
Figure 18B:
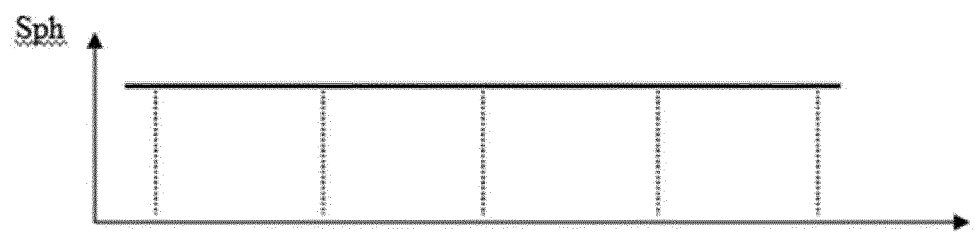

For example, as illustrated on FIGS. 18a and 18b, at least part, for example all of the optical elements have a constant optical power and a discontinue first derivative between two contiguous optical elements. In the examples illustrated on FIGS. 18a and 18b, teta is the angular coordinate in polar reference. As one can observe in this embodiment, there is no area between the contiguous optical elements with no sphere.

Figure 19A:
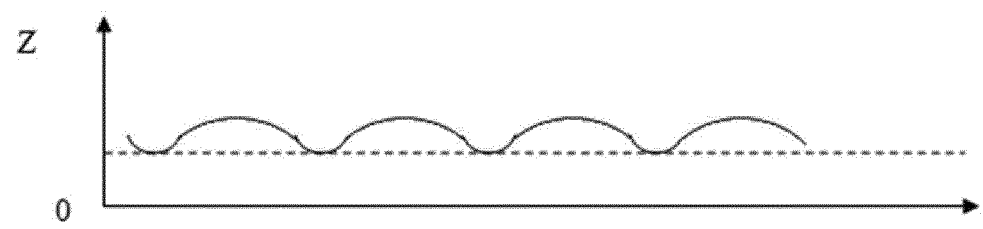
Figure 19B:
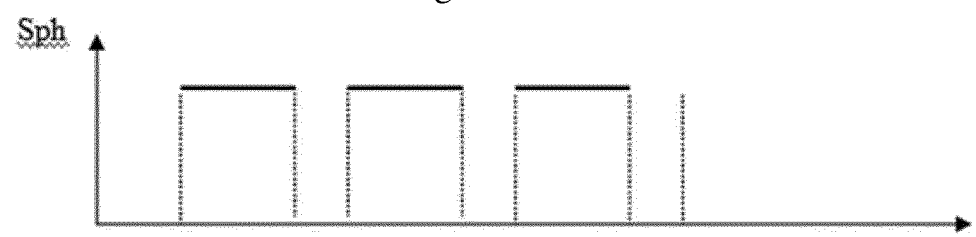

Alternatively, as illustrated on FIGS. 19a and 19b, at least part, for example all, of the optical elements have a varying optical power and a continue first derivative between two contiguous optical elements.

To obtain such variation, here one may use two constant powers, one positive and one negative. The area of the negative power is much smaller than the area of the positive power, so that globally one has a positive power effect.

An important point in this embodiment illustrated on FIGS. 19a and 19b is that the Z coordinate is always positive compared to the refraction area.

Figure 2:
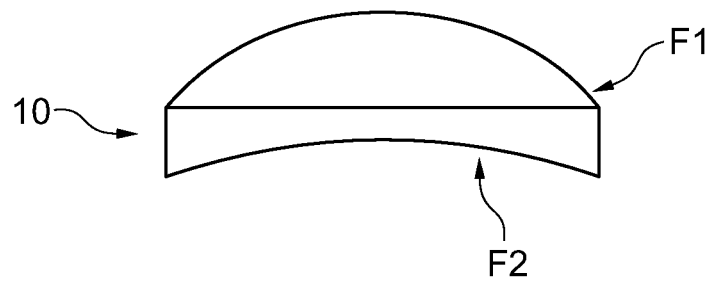
FIG. 2 is a general profile view of a lens element according to the invention.

As illustrated on FIG. 2, a lens element 10 according to the invention comprises an object side surface F1 formed as a convex curved surface toward an object side, and an eye side surface F2 formed as a concave surface having a different curvature than the curvature of the object side surface F1.

According to an embodiment of the invention, at least part, for example all, of the optical elements are located on the front surface of the lens element.

At least part, for example all, of the optical elements may be located on the back surface of the lens element.

At least part, for example all, of the optical elements may be located between the front and back surfaces of the lens element. For example, the lens element may comprise zones of different refractive index forming the optical elements.

According to an embodiment of the invention, at least one of the optical elements has an optical function of focusing an image for peripheral vision on a position other than the retina.

Preferably, at least 50%, for example at least 80%, for example all, of the optical elements have an optical function of focusing an image for peripheral vision on a position other than the retina.

According to a preferred embodiment of the invention, all of the optical elements are configured so that the mean focus of the light rays passing through each optical element is at a same distance to the retina of the wearer, at least for peripheral vision.

The optical function, in particular the dioptric function, of each optical element may be optimized so as to provide a focus image, in particular in peripheral vision, at a constant distance of the retina of the eye of the wearer. Such optimization requires adapting the dioptric function of each of the optical element depending on their position on the lens element.

In particular, the inventors have determined that spot diagram of the beam of light passing through a spherical 3D shaped micro lens analyzed in peripheral vision (30° from the pupil center) is not a point.

To obtain a point the inventors have determined that the optical element should have a cylindrical power, for example have a toric shape.

The kind of astigmatism commonly encountered as a vision defect is a result of different lens curvatures in different planes. But even spherical lenses that are perfectly symmetrical exhibit a type of astigmatism for light which approaches the lens from a point off the optic axis. As illustrated on FIG. 10b, oblique astigmatism is an aberration of off-axis rays that causes radial and tangential lines in the object plane to focus sharply at different distances in the image space Therefore, looking at a spherical lens through its optical axis does not generate astigmatism. If the optical elements are seen so that the axis of the optical element passes through the eye, in particular through the center of the pupil for peripheral vision, then there is no astigmatism. However, in all other cases, and even more so when the optical elements are excentric compared to the gazing direction, in particular for the peripheral vision, one has an oblique astigmatism. The light passing through the optical element does not "see" the same power in all the meridians, i.e. from the center to the edge of the optical elements.

According to an embodiment of the invention, the optical elements are configured so that at least along one section of the lens the mean sphere of the optical elements increases from a point of said section towards the periphery of said section.

The optical elements may further be configured so that at least along one section of the lens, for example at least the same section as the one along which the mean sphere of the optical elements increases, the cylinder increases from a point of said section, for example the same point as for the mean sphere, towards the peripheral part of said section.

Advantageously, having optical elements configured so that along at least one section of the lens the mean sphere and/or mean cylinder of optical elements increases from a point of said section towards the peripheral part of said section allows increasing the defocus of the light rays in front the retina in case of myopia or behind the retina in case of hyperopia.

In other words, the inventors have observed that having optical elements configured so that along at least one section of the lens the mean sphere of optical elements increases from a point of said section towards the peripheral part of said section helps slow down the progression of abnormal refraction of the eye such as myopia or hyperopia.

The optical elements may be configured so that that along the at least one section of the lens the mean sphere and/or the cylinder of optical elements increases from the center of said section towards the peripheral part of said section.

According to an embodiment of the invention, the optical elements are configured so that in standard wearing condition the at least one section is a horizontal section.

The mean sphere and/or the cylinder may increase according to an increase function along the at least one horizontal section, the increase function being a Gaussian function. The Gaussian function may be different between the nasal and temporal part of the lens so as to take into account the dissymmetry of the retina of the person.

Alternatively, the mean sphere and/or the cylinder may increase according to an increase function along the at least one horizontal section, the increase function being a Quadratic function. The Quadratic function may be different between the nasal and temporal part of the lens so as to take into account the dissymmetry of the retina of the person.

According to an embodiment of the invention, the mean sphere and/or the cylinder of optical elements increases from a first point of said section towards the peripheral part of said section and decreases from a second point of said section towards the peripheral part of said section, the second point being closer to the peripheral part of said section than the first point.

Such embodiment is illustrated in table 1 that provides the mean sphere of optical elements according to their radial distance to the optical center of the lens element.

In the example of table 1, the optical elements are micro-lenses placed on a spherical front surface having a curvature of 329.5 mm and the lens element is made of an optical material having a refractive index of 1.591, the prescribed optical power of the wearer is of 6 D. The optical element is to be worn in standard wearing conditions and the retina of the wearer is considered as having a defocus of 0.8 D at an angle of 30°. The optical elements are determined to have a peripheral defocus of 2 D.

TABLE 1

| Distance to optical center (mm) | Mean sphere of optical element (D) |
|---|---|
| 0 | 1.992 |
| 5 | 2.467 |
| 7.5 | 2.806 |
| 10 | 3.024 |
| 15 | 2.998 |
| 20 | 2.485 |

As illustrated in table 1, starting close to the optical center of the lens element, the mean sphere of the optical elements increases towards the peripheral part of said section and then decreases towards the peripheral part of said section.

According to an embodiment of the invention, the mean cylinder of optical elements increases from a first point of said section towards the peripheral part of said section and decreases from a second point of said section towards the peripheral part of said section, the second point being closer to the peripheral part of said section than the first point.

Such embodiment is illustrated in tables 2 and 3 that provides the amplitude of the cylinder vector projected on a first direction Y corresponding to the local radial direction and a second direction X orthogonal to the first direction.

In the example of table 2, the optical elements are micro-lenses placed on a spherical front surface having a curvature of 167.81 mm and the lens element is made of a material having a refractive index of 1.591, the prescribed optical power of the wearer is of −6 D. The lens element is to be worn in standard wearing conditions and the retina of the wearer is considered as having a defocus of 0.8 D at an angle of 30°. The optical elements are determined to provide a peripheral defocus of 2 D.

In the example of table 3, the optical elements are micro-lenses placed on a spherical front surface having a curvature of 167.81 mm and the lens element is made of a material having a refractive index of 1.591, the prescribed optical power of the wearer is of −1 D. The lens element is to be worn in standard wearing conditions and the retina of the wearer is considered as having a defocus of 0.8 $D_i$ at an angle of 30°. The optical elements are determined to provide a peripheral defocus of 2 D.

TABLE 2

| gazing direction (in degree) | Px (in Diopter) | Py (in Diopter) | Cylinder (in Diopter) |
|---|---|---|---|
| 0 | 1.987 | 1.987 | 1.987 |
| 18.581 | 2.317 | 2.431 | 2.374 |
| 27.002 | 2.577 | 2.729 | 2.653 |
| 34.594 | 2.769 | 2.881 | 2.825 |
| 47.246 | 2.816 | 2.659 | 2.7375 |
| 57.02 | 2.446 | 1.948 | 2.197 |

TABLE 3

| gazing direction (in degree) | Px (in Diopter) | Py (in Diopter) | Cylinder (in Diopter) |
|---|---|---|---|
| 0 | 1.984 | 1.984 | 1.984 |
| 18.627 | 2.283 | 2.163 | 2.223 |
| 27.017 | 2.524 | 2.237 | 2.3805 |
| 34.526 | 2.717 | 2.213 | 2.465 |
| 46.864 | 2.886 | 1.943 | 2.4145 |
| 56.18 | 2.848 | 1.592 | 2.22 |

As illustrated in tables 2 and 3, starting close to the optical center of the lens element, the cylinder of the optical elements increases towards the peripheral part of said section and then decreases towards the peripheral part of said section.

According to an embodiment of the invention, the prescription portion comprises an optical center and optical elements are configured so that along any section passing through the optical center of the lens the mean sphere and/or the cylinder of the optical elements increases from the optical center towards the peripheral part of the lens.

For example, the optical elements may be regularly distributed along circles centered on the optical center of the portion.

The optical elements on the circle of diameter 10 mm and centered on the optical center of the prescription portion may be micro lenses having a mean sphere of 2.75 D.

The optical elements on the circle of diameter 20 mm and centered on the optical center of the prescription portion may be micro lenses having a mean sphere of 4.75 D.

The optical elements on the circle of diameter 30 mm and centered on the optical center of the prescription portion may be micro lenses having a mean sphere of 5.5 D. The optical elements on the circle of diameter 40 mm and centered on the optical center of the prescription portion may be micro lenses having a mean sphere of 5.75 D.

The cylinder of the different micro lenses may be adjusted based on the shape of the retina of the person.

According to an embodiment of the invention, the prescription portion comprises a far vision reference point, a near vision reference, and a meridian joining the far and near vision reference points. For example, the prescription portion may comprise a progressive additional lens design adapted to the prescription of the person or adapted to slow down the progression of the abnormal refraction of the eye of the person wearing the lens element.

Preferably, according to such embodiment, the optical elements are configured so that in standard wearing conditions along any horizontal section of the lens the mean sphere and/or the cylinder of the optical elements increases from the intersection of said horizontal section with the meridian line towards the peripheral part of the lens.

The meridian line corresponds to the locus of the intersection of the main gaze direction with the surface of the lens.

The mean sphere and/or the mean cylinder increase function along the sections may be different depending on the position of said section along the meridian line.

In particular, the mean sphere and/or the mean cylinder increase function along the sections are unsymmetrical. For example, the mean sphere and/or the mean cylinder increase function are unsymmetrical along vertical and/or horizontal section in standard wearing conditions.

According to an embodiment of the invention, at least one of the optical elements has a non-focused optical function in standard wearing conditions and for peripheral vision.

Preferably at least 50%, for example at least 80%, for example all, of the optical elements 14 have a non-focused optical function in standard wearing conditions and for peripheral vision.

In the sense of the invention, a "non-focused optical function" is to be understood as not having a single focus point in standard wearing conditions and for peripheral vision.

Advantageously, such optical function of the optical element reduces the deformation of the retina of the eye of the wearer, allowing to slow down the progression of the abnormal refraction of the eye of the person wearing the lens element.

The at least one element having a non-focused optical function is transparent. Advantageously, the non-contiguous optical elements are not visible on the lens element and do not affect the aesthetic of the lens element.

According to an embodiment of the invention, the lens element may comprise an ophthalmic lens bearing the prescription portion and a clip-on bearing the plurality of at least three optical elements adapted to be removably attached to the ophthalmic lens when the lens element is worn.

Advantageously, when the person is in a far distance environment, outside for example, the person may separate the clip-on from the ophthalmic lens and eventually substitute a second clip-on free of any of at least three optical elements. For example, the second clip-on may comprise a solar tint. The person may also use the ophthalmic lens without any additional clip-on.

The optical element may be added to the lens element independently on each surface of the lens element.

One can add these optical elements on a defined array like square or hexagonal or random or other.

The optical element may cover specific zones of the lens element, like at the center or any other area.

The optical element density or the quantity of power may be adjusted depending on zones of the lens element. Typically, the optical element may be positioned in the periphery of the lens element, in order to increase the effect of the optical element on myopia control, so as to compensate peripheral defocus due to the peripheral shape of the retina for example.

According to a preferred embodiment of the invention, every circular zone having a radius comprised between 2 and 4 mm comprising a geometrical center located at a distance of the optical center of the lens element greater or equal to said radius+5 mm, the ratio between the sum of areas of the parts of optical elements located inside said circular zone and the area of said circular zone is comprised between 20% and 70%, preferably between 30% and 60%, and more preferably between 40% and 50%.

The optical elements can be made using different technologies as direct surfacing, molding, casting or injection, embossing, filming, or photolithography etc . . . .

According to an embodiment of the invention, at least one, for example all, of the optical elements has a shape configured so as to create a caustic in front of the retina of the eye of the person. In other words, such optical element is configured so that every section plane where the light flux is concentrated if any, is located in front of the retina of the eye of the person.

According to an embodiment of the invention, the at least one, for example all, of the optical element having a non-spherical optical function is a multifocal refractive microlens.

In the sense of the invention, an optical element is "multifocal refractive micro-lens" includes bifocals (with two focal powers), trifocals (with three focal powers), progressive addition lenses, with continuously varying focal power, for example aspherical progressive surface lenses.

In the sense of the invention, a "micro-lens" has a contour shape being inscribable in a circle having a diameter greater than or equal to 0.8 mm and smaller than or equal to 3.0 mm, preferably greater than or equal to 1.0 mm and smaller than 2.0 mm.

According to an embodiment of the invention, at least one of the optical element, preferably more than 50%, more preferably more than 80% of the optical elements are aspherical microlenses. In the sense of the invention, aspherical microlenses have a continuous power evolution over their surface.

An aspherical microlens may have an asphericity comprised between 0.1 D and 3D. The asphericity of an aspherical microlens corresponds to the ratio of optical power measured in the center of the microlens and the optical power measured in the periphery of the microlens.

The center of the microlens may be defined by a spherical area centered on the geometrical center of the microlens and having a diameter comprised between 0.1 mm and 0.5 mm, preferably equal to 2.0 mm.

The periphery of the microlens may be defined by an annular zone centered on the geometrical center of the microlens and having an inner diameter comprised between 0.5 mm and 0.7 mm and an outer diameter comprised between 0.70 mm and 0.80 mm.

According to an embodiment of the invention, the aspherical microlenses have an optical power in their geometrical center comprised between 2.0 D and 7.0 D in absolute value, and an optical power in their periphery comprised between 1.5 D and 6.0 D in absolute value.

The asphericity of the aspherical microlenses before the coating of the surface of the lens element on which the optical elements are disposed may vary according to the radial distance from the optical center of said lens element.

Additionally, the asphericity of the aspherical microlenses after the coating of the surface of the lens element on which the optical elements are disposed may further vary according to the radial distance from the optical center of said lens element.

According to an embodiment of the invention, the at least one multifocal refractive micro-lens has a toric surface. A toric surface is a surface of revolution that can be created by rotating a circle or arc about an axis of revolution (eventually positioned at infinity) that does not pass through its center of curvature.

Toric surface lenses have two different radial profiles at right angles to each other, therefore producing two different focal powers.

Toric and spheric surface components of toric lenses produce an astigmatic light beam, as opposed to a single point focus.

According to an embodiment of the invention, the at least one of the optical elements having a non-spherical optical function, for example all, of the optical elements is a toric refractive micro-lens. For example, a toric refractive micro-lens with a sphere power value greater than or equal to 0 diopter ($\delta$) and smaller than or equal to +5 diopters ($\delta$), and cylinder power value greater than or equal to 0.25 Diopter ($\delta$).

Oblique effects of peripheral light rays passing through spherical micro-lenses generate an oblique astigmatism, and thus unfocused light beams.

Advantageously, having toric micro-lenses allows focusing the light rays passing through the micro-lenses at a given distance from the retina of the wearer.

As a specific embodiment, the toric refractive microlens may be a pure cylinder, meaning that minimum meridian power is zero, while maximum meridian power is strictly positive, for instance less than 5 Diopters.

According to an embodiment of the invention, at least one, for example all, of the optical element, is made of a birefringent material. In other words, the optical element is made of a material having a refractive index that depends on the polarization and propagation direction of light. The birefringence may be quantified as the maximum difference between refractive indices exhibited by the material.

According to an embodiment of the invention, at least one, for example all of the optical element, has discontinuities, such as a discontinuous surface, for example Fresnel surfaces and/or having a refractive index profile with discontinuities.

FIG. 3 represents an example of a Fresnel height profile of an optical element that may be used for the invention.

According to an embodiment of the invention, at least one, for example all of the optical element, is made of a diffractive lens.

Figure 4:
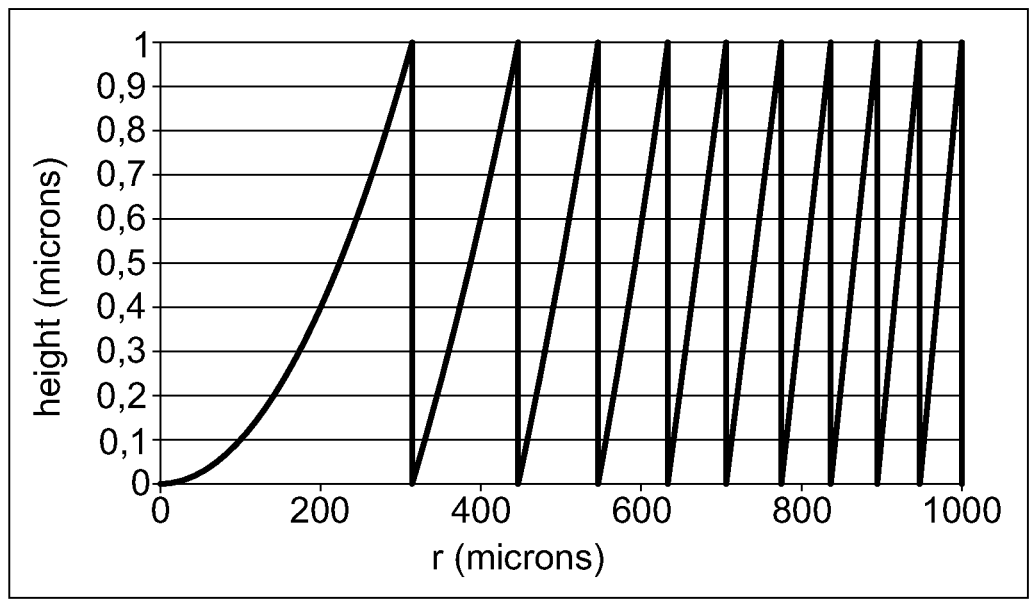
FIG. 4 represents an example of a diffractive lens radial profile.

FIG. 4 represents an example of a diffractive lens radial profile of an optical element that may be used for the invention.

At least one, for example all, of the diffractive lenses may comprise a metasurface structure as disclosed in WO2017/176921.

Figure 5:
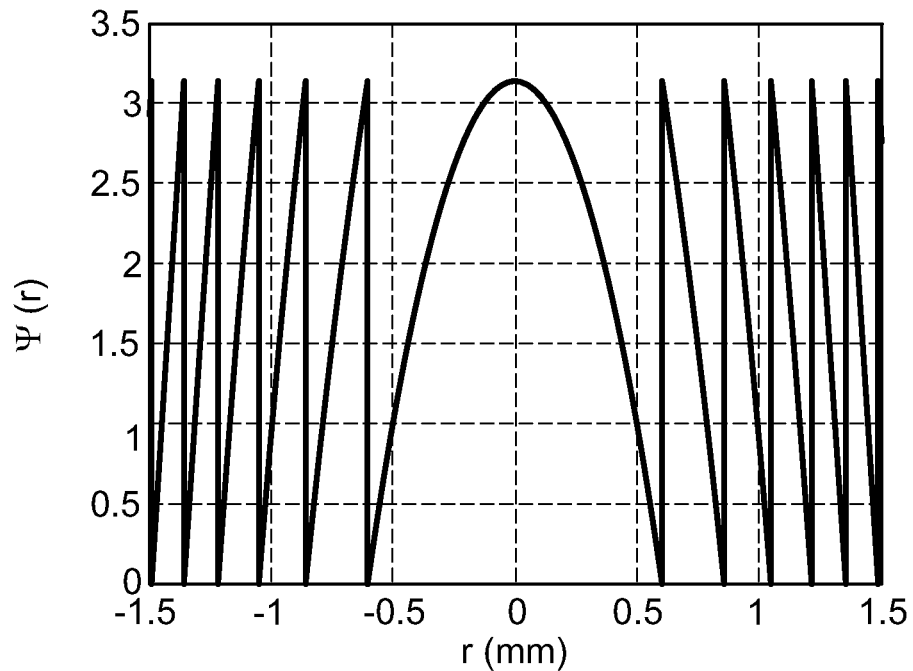
FIG. 5 illustrates a π-Fresnel lens profile.

The diffractive lens may be a Fresnel lens whose phase function $\psi(r)$ has $\pi$ phase jumps at the nominal wavelength, as seen in FIG. 5. One may give these structures the name "$\pi$-Fresnel lenses" for clarity's sake, as opposition to unifocal Fresnel lenses whose phase jumps are multiple values of $2\pi$. The $\pi$-Fresnel lens whose phase function is displayed in FIG. 5 diffracts light mainly in two diffraction orders associated to dioptric powers 0 $\delta$ and a positive one P, for example3 $\delta$.

According to an embodiment of the invention, at least one, for example all of the optical element, is a multifocal binary component.

Figure 6A:
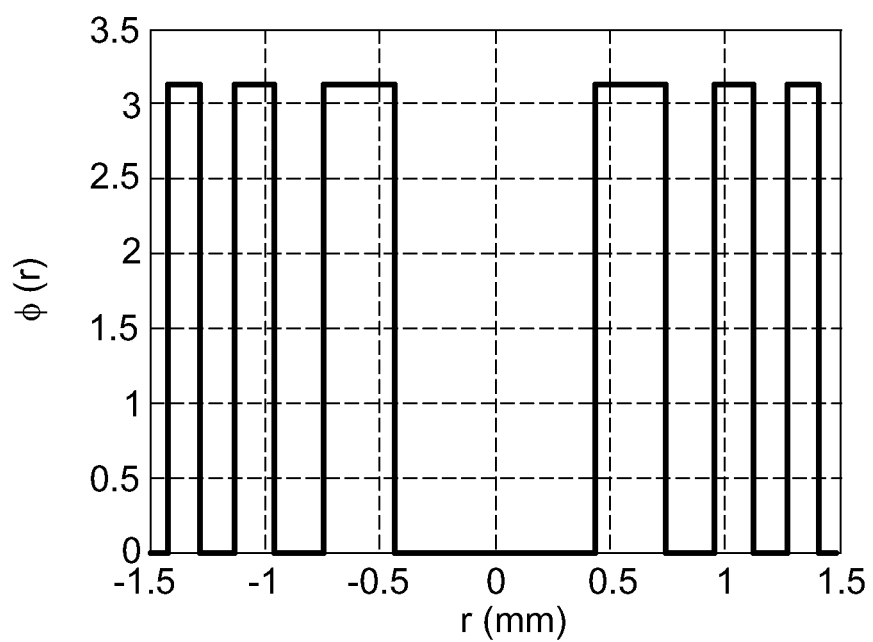
FIGS. 6a to 6c illustrate a binary lens embodiment of the invention.
Figure 6B:
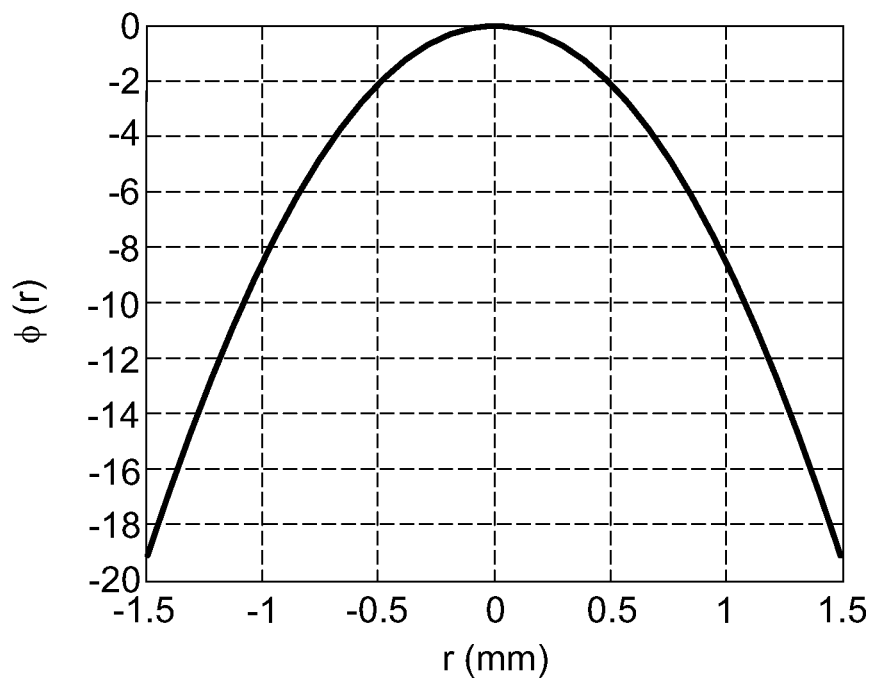
Figure 6C:
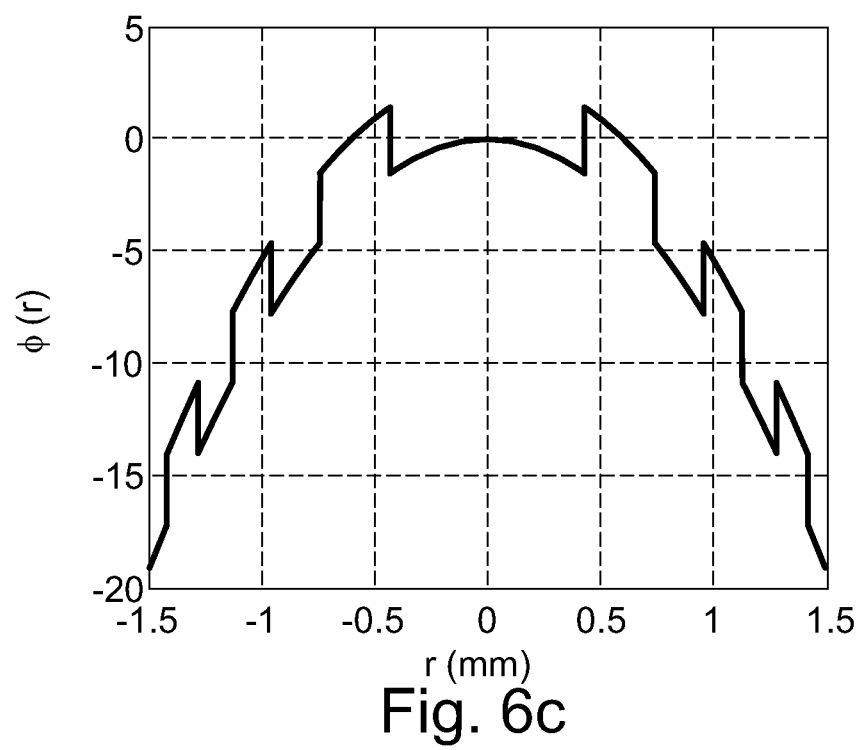

For example, a binary structure, as represented in FIG. 6a, displays mainly two dioptric powers, denoted $-P/2$ and $P/2$. When associated to a refractive structure as shown in FIG. 6b, whose dioptric power is $P/2$, the final structure represented in FIG. 6c has dioptric powers 0 $\delta$ and P. The illustrated case is associated to P=3 $\delta$.

According to an embodiment of the invention, at least one, for example all of the optical element, is a pixelated lens. An example of multifocal pixelated lens is disclosed in Eyal Ben-Eliezer et al, APPLIED OPTICS, Vol. 44, No. 14, 10 May 2005.

According to an embodiment of the invention, at least one, for example all of the optical element, has an optical function with high order optical aberrations. For example, the optical element is a micro-lens composed of continuous surfaces defined by Zernike polynomials.

According to an embodiment of the invention, at least one, for example at least 70%, for example all optical elements are active optical element that may be activated manually or automatically by an optical lens controller device.

The active optical element may comprise a material having a variable refractive index whose value is controlled by the optical lens controller device.

The invention also relates to a method for determining a lens element adapted to slow down the progression of the abnormal refraction of the eye of a wearer.

Figure 11:
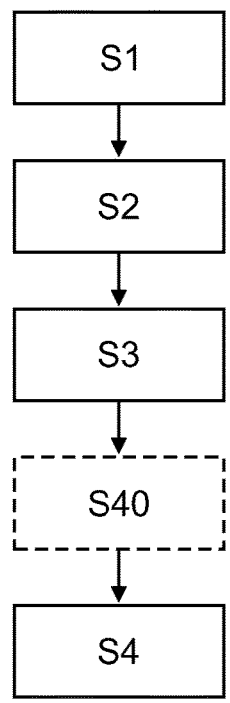
FIG. 11 is a flowchart of a method according to the invention.
Figure 10B:
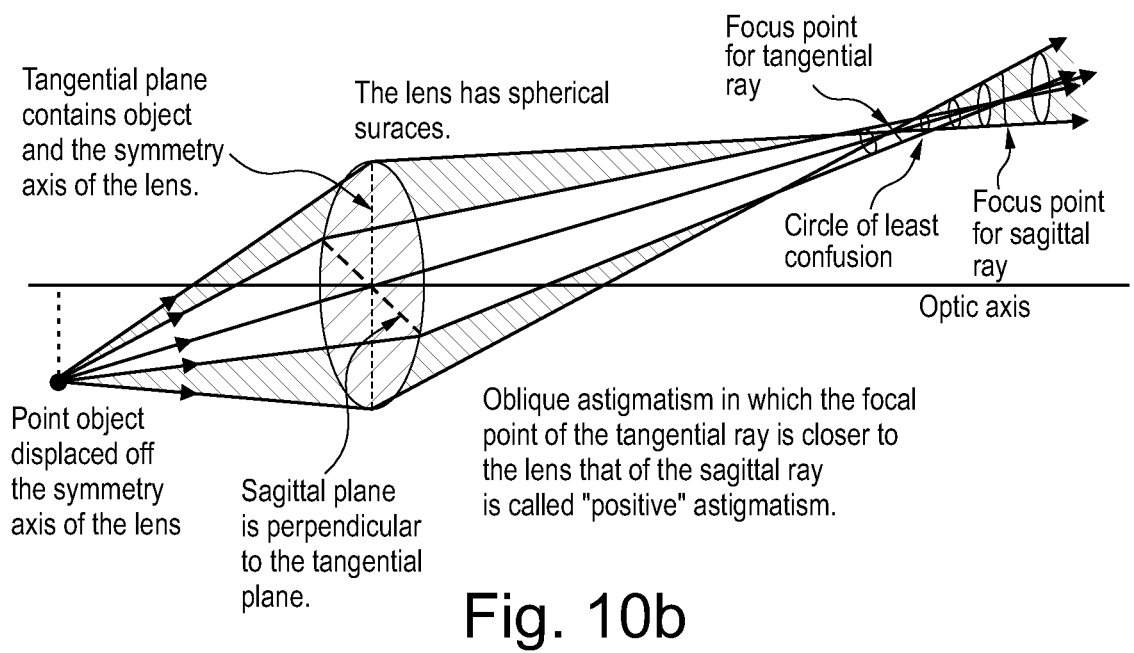
FIG. 10b illustrates oblique astigmatism.

As illustrated on FIG. 11, the method of the invention comprises at least:
- a wearer prescription data providing step S1,
- a wearing condition data providing step S2,
- a wearer retina data providing step S3, and
- a lens element determining step S4, During the wearer prescription data providing step S1, wearer prescription data relating the prescription of the wearer are provided.

Wearing condition data relating to wearing conditions of the lens element by the wearer are provided during the wearer condition data providing step S2.

According to an embodiment of the invention, the wearing condition data provided during the wearing condition data providing step correspond to standard wearing conditions.

Alternatively, the wearing condition data provided during the wearing condition data providing step correspond to wearing conditions measured on the wearer or customized for example based on morphological or postural data relating the wearer.

During the wearer retina data providing step S3, retina data relating to the shape of the retina of the wearer in the same reference frame as the wearing conditions are provided.

According to an embodiment of the invention, the wearer retina data provided during the wearer retina data providing step correspond to standard retina shape.

Examples of standard retina shapes are disclosed in "Refractive error, axial length, and relative peripheral refractive error before and after the onset of myopia" by Mutti D O1, Hayes J R, Mitchell G L, Jones L A, Moeschberger M L, Cotter S A, Kleinstein R N, Manny R E, Twelker J D, Zadnik K; CLEERE Study Group, Invest Ophthalmol Vis Sci. 2007 June; 48(6):2510-9.

Further examples of standard retina shapes are disclosed in "Peripheral refraction along the horizontal and vertical visual fields in myopia", by Atchison D A1, Pritchard N, Schmid K L, Vision Res. 2006 April; 46(8-9):1450-8.

Additional examples of standard retina shapes are disclosed in "Peripheral Refraction and Ocular Shape in Children", by Donald O. Mutti, Robert I. Sholtz, Nina E. Friedman, and Karla Zadnik in IOVS, April 2000, Vol. 41, No. 5.

Alternatively, the wearer retina data provided during the wearer retina data providing step may correspond to the shape of the retina measured on the wearer or customized for example based on morphological or prescription of the wearer.

During the lens element determining step S4 a lens element comprising a prescription portion and a plurality of at least three optical elements is determined.

The lens element is determined so that the prescription portion provides in wearing conditions corresponding to the wearing data and for foveal vision a first optical power based on the prescription of the wearer.

Furthermore, at least one optical element, for example at least 50%, preferably at least 80% of the optical elements, is determined to has to have an optical function of not focusing an image on the retina of the eye for peripheral vision.

Advantageously the determined lens element provided for foveal vision correction corresponding to the prescription of the wearer and for According to an embodiment of the invention, during the lens element determining step at least 50%, for example at least 80%, of the optical elements are determined so as to focus an image at a given distance of the retina. Said distance is defined for each optical element along the axis linking a reference point of said optical element, for example the optical center of the lens element, and the center of the pupil of the wearer.

Alternatively, at least 50%, for example at least 80%, of the optical elements are determined so as to focus an image at a same distance of the retina along the axis linking a reference point of each optical element and the center of the pupil of the wearer.

As illustrated on FIG. 11, the method of the invention may further comprise a front surface data providing step S40.

During the front surface data providing step S40, front surface data representative of the front surface of the lens element are provided.

According to such embodiment, during the lens element determining step the shape of the back surface and the optical elements to be placed on the front surface are determined so that the prescription portion provides in wearing conditions corresponding to the wearing data and for foveal vision a first optical power based on the prescription of the wearer and at least one optical element has an optical function of not focusing an image on the retina of the eye for peripheral vision.

According to a preferred embodiment, during the lens element determining step the shape of the back surface is determined so that the prescription portion provides in wearing conditions corresponding to the wearing data and for foveal vision a first optical power based on the prescription of the wearer.

The optical elements are determined so as to be placed either on the front or back surface of the lens determined previously and to focus images at a given distance of the retina of the eye for peripheral vision.

As seen, it is possible to optimize the optical elements themselves, but also, it is possible to optimize the opposite lens surface, or combine the two, to reduce aberrations of the optical element for peripheral vision. In this case, it would be a compromise between the optimization of the prescription portion and the optical elements. This is particularly relevant when the optical element are mass produced (mold, film embedded in a lens).

The invention has been described above with the aid of embodiments without limitation of the general inventive concept.

Many further modifications and variations will be apparent to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A lens element intended to be worn in front of an eye of a wearer comprising:
   a prescription portion configured to provide to the wearer in standard wearing conditions and for foveal vision a first optical power based on the prescription of the wearer for correcting an abnormal refraction of said eye of the wearer; and a plurality of at least three optical elements, at least one optical element having an optical function of not focusing an image on a retina of the eye in standard wearing conditions and for peripheral vision to slow down progression of the abnormal refraction of the eye, wherein all of the optical elements are configured so that a mean focus of light rays passing through each optical element is at a same distance to the retina of the wearer for peripheral vision.

2. The lens element according to claim 1, wherein at least one of the optical element has an optical function of focusing an image on a position other than the retina in standard wearing conditions and for peripheral vision.

3. The lens element according to claim 1, wherein least one optical element has a non-focused optical function in standard wearing conditions and for peripheral vision.

4. The lens element according to claim 1, wherein at least one of the optical elements has a cylindrical power.

5. The lens element according to claim 1, wherein the optical elements are configured so that along at least one section of the lens a mean sphere of optical elements increases from a point of said section towards a peripheral part of said section.

6. The lens according to claim 1, wherein the optical elements are configured so that along at least one section of the lens a cylinder of optical elements increases from a point of said section towards a peripheral part of said section.

7. The lens element according to claim 1, wherein the optical elements are configured so that along at least one section of the lens element mean sphere and/or a cylinder of optical elements increases from the center of said section towards a peripheral part of said section.

8. The lens element according to claim 1, wherein the prescription portion comprises an optical center and the optical elements are configured so that along any section passing through the optical center of the lens a mean sphere and/or a cylinder of the optical elements increases from the optical center towards a peripheral part of the lens.

9. The lens element according to claim 1, wherein the prescription portion is formed as the portion other than the portions formed as the plurality of optical elements.

10. The lens element according to claim 1, wherein for every circular zone having a radius comprised between 2 and 4 mm comprising a geometrical center, said geometrical center being located at a distance greater than or equal to said radius +5 mm from a framing reference point that faces a pupil of a user gazing straight ahead in standard wearing conditions, a ratio between a sum of areas of parts of optical elements located inside a circular zone and a total area of said circular zone is comprised between 20% and 70%.

11. The lens element according to claim 1, wherein the at least three optical elements are non-contiguous.

12. The lens element according to claim 1, wherein at least part of the optical elements are located on the front surface of the lens element.

* * * * *